(12) United States Patent
Hwang et al.

(10) Patent No.: US 10,158,510 B2
(45) Date of Patent: *Dec. 18, 2018

(54) APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

(71) Applicant: LG ELECTRONICS INC., Seoul (KR)

(72) Inventors: Jaeho Hwang, Seoul (KR); Woosuk Ko, Seoul (KR); Sungryong Hong, Seoul (KR); Jongwoong Shin, Seoul (KR); Jinwoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/466,471

(22) Filed: Mar. 22, 2017

(65) Prior Publication Data

US 2017/0195154 A1   Jul. 6, 2017

Related U.S. Application Data

(63) Continuation of application No. 14/455,079, filed on Aug. 8, 2014, now Pat. No. 9,641,370.

(Continued)

(51) Int. Cl.
*H04B 7/02*   (2018.01)
*H04L 1/02*   (2006.01)
(Continued)

(52) U.S. Cl.
CPC ....... *H04L 27/2602* (2013.01); *H04B 7/0413* (2013.01); *H04L 27/2626* (2013.01);
(Continued)

(58) Field of Classification Search
CPC .... H04B 7/0413; H04B 7/0446; H04L 5/0023
See application file for complete search history.

(56) References Cited

U.S. PATENT DOCUMENTS

| 8,670,494 B2 * | 3/2014 | Ko ........................ H04L 1/0057 |
| | | 375/260 |
| 9,385,823 B2 | 7/2016 | Ko et al. |

(Continued)

FOREIGN PATENT DOCUMENTS

| CN | 101548517 A | 9/2009 |
| CN | 101730995 A | 6/2010 |

(Continued)

*Primary Examiner* — Shuwang Liu
*Assistant Examiner* — Gina McKie
(74) *Attorney, Agent, or Firm* — Dentons US LLP

(57) ABSTRACT

A method and an apparatus for transmitting broadcast signals thereof are disclosed. An apparatus for transmitting broadcast signals comprises an encoder for encoding service data corresponding to each of a plurality of data transmission path, wherein each of the data transmission path carries at least one service component, a mapper for mapping the encoded service data onto constellations, an encoder for encoding physical signaling data, a frame builder for building at least one signal frame including preamble data, the encoded physical signaling data, the mapped service data, wherein the preamble data is located before the encoded physical signaling data and the encoded physical signaling data is located before the mapped service data, a modulator for modulating the at least one signal frame by an OFDM (Orthogonal Frequency Division Multiplex) scheme and a transmitter for transmitting the broadcast signals carrying the at least one modulated signal frame, wherein the broadcast signals includes channel information data, wherein the channel information data includes binding information between the service data and the data transmission path.

12 Claims, 27 Drawing Sheets

Related U.S. Application Data

(60) Provisional application No. 61/863,893, filed on Aug. 8, 2013.

(51) Int. Cl.
*H04L 27/26* (2006.01)
*H04B 7/0413* (2017.01)
*H04L 5/00* (2006.01)

(52) U.S. Cl.
CPC ...... *H04L 27/2627* (2013.01); *H04L 27/2647* (2013.01); *H04L 27/2649* (2013.01); *H04L 5/0053* (2013.01)

(56) References Cited

U.S. PATENT DOCUMENTS

| | | |
|---|---|---|
| 2009/0041129 A1 | 2/2009 | Suh et al. |
| 2009/0129338 A1* | 5/2009 | Horn ..................... H04W 48/10 370/331 |
| 2010/0037120 A1 | 2/2010 | Limberg |
| 2010/0074448 A1 | 3/2010 | Park et al. |
| 2011/0055887 A1 | 3/2011 | Vaere et al. |
| 2011/0261902 A1 | 10/2011 | Lee et al. |
| 2012/0051360 A1 | 3/2012 | Kitazato et al. |
| 2012/0327879 A1 | 12/2012 | Stadelmeier et al. |
| 2013/0291040 A1 | 10/2013 | Rhyu et al. |
| 2014/0157304 A1 | 6/2014 | Fay et al. |
| 2016/0234861 A1 | 8/2016 | Ye et al. |

FOREIGN PATENT DOCUMENTS

| | | |
|---|---|---|
| CN | 101836447 A | 9/2010 |
| CN | 102783050 A | 11/2012 |
| EP | 2536136 A2 | 12/2012 |
| WO | 2009/028854 A1 | 3/2009 |
| WO | 2014/112797 A1 | 7/2014 |
| WO | 2014/182038 A1 | 11/2014 |

* cited by examiner

FIG. 21

| Syntax | No. of bits |
|---|---|
| Fast Acquisition Channel() { | |
| Num_Service | 8 |
| for ( i=0; i< Num_service ; i++){ | |
|   Service_id | 8 |
|   Section_DP_ID | 8 |
|   Num_Component | 8 |
|   reserved | 8 |
|   for (i=0; i< Num_component ; i++) { | |
|     Component_type | 8 |
|     DP_ID | 8 |
|     reserved | 8 |
|   } | |
| } | |
| CRC_32 | 32 |
| } | |

(a)

| Component Type | Note |
|---|---|
| 0x00 | Service |
| 0x01 | Video |
| 0x02 | Audio |
| 0x03 | Section |
| 0x04 | NRT |
| others | reserved |

| Profile | Service | Service ID | Section | Component type | DP ID |
|---|---|---|---|---|---|
| Advanced | UHD | 0x01 | DP 1 | AV | DP 1 |
|  | HD | 0x02 | DP 2 | V | DP 2 |
|  |  |  |  | A | DP 3 |
| Hand-held | SD | 0x03 | DP 1 | AV | DP 1 |
|  | HD | 0x04 | DP 2 | V | DP 2 |
|  |  |  |  | A | DP 3 |
| Base | HD | 0x04 | DP1 | AV | DP 1 |
|  | NRT | 0x05 | DP2 | NRT | DP 2 |

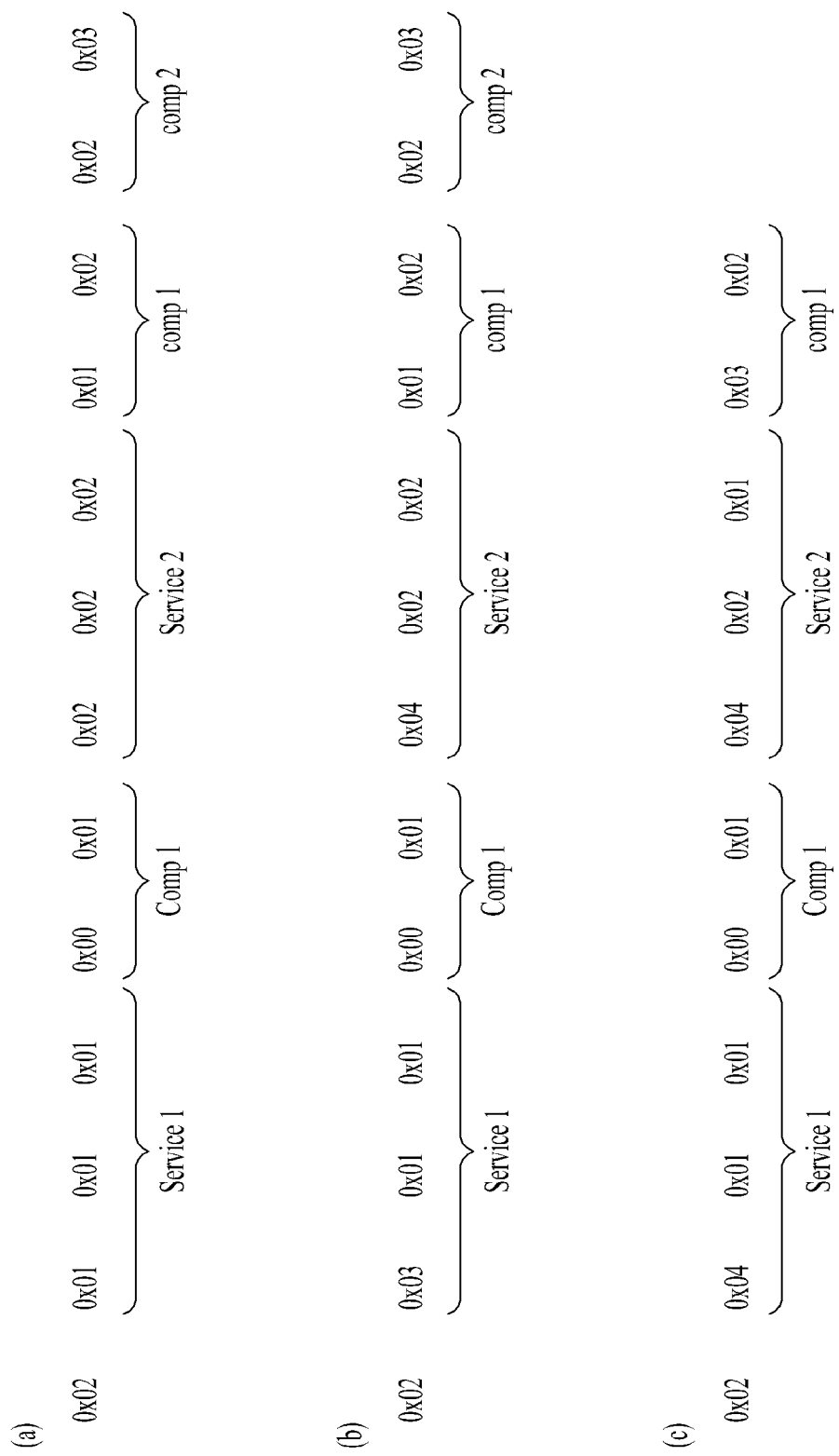

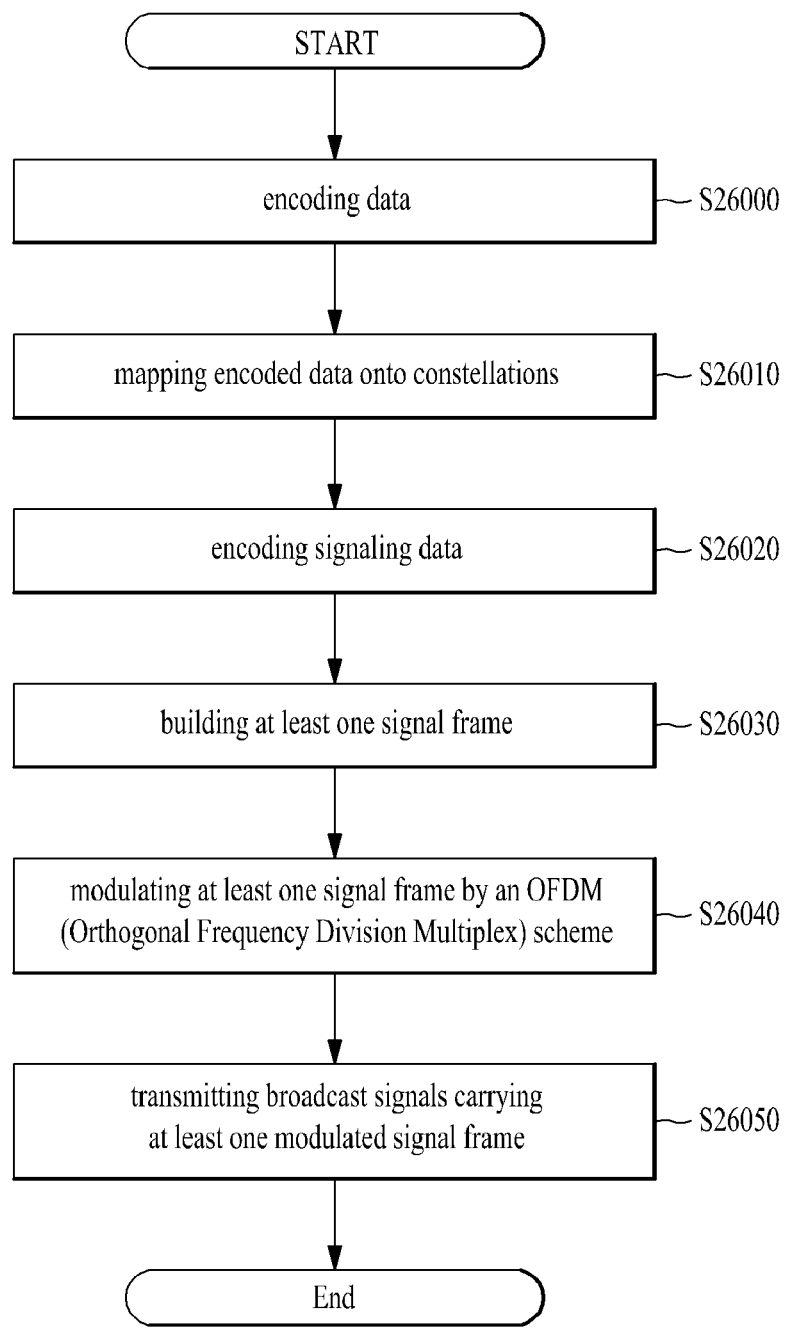

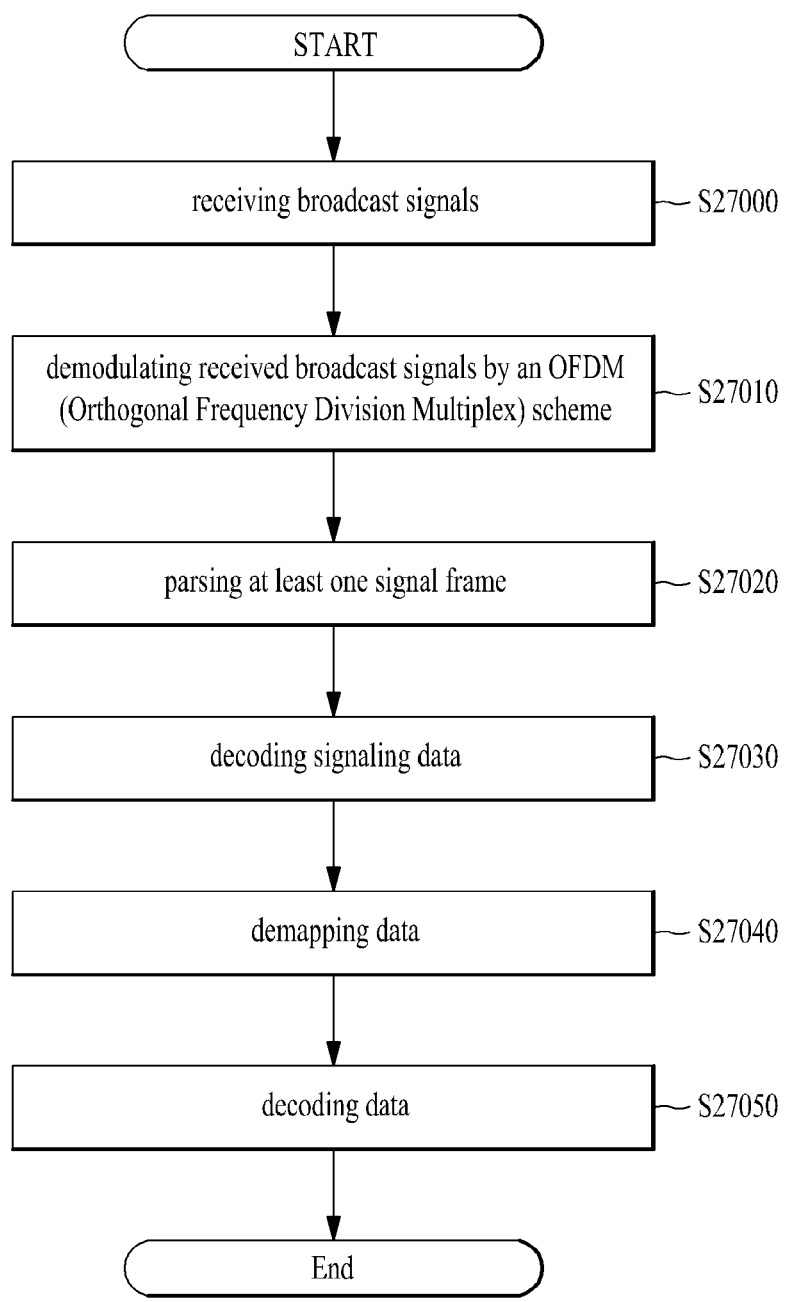

APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

This application is a continuation application of U.S. patent application Ser. No. 14/455,079 filed on Aug. 8, 2014, which claims the benefit of and priority to Provisional Application No. 61/863,893, filed Aug. 8, 2013, all of which are hereby incorporated by reference in their entirety for all purposes as if fully set forth herein.

BACKGROUND OF THE INVENTION

Field of the Invention

The present invention relates to an apparatus for transmitting broadcast signals, an apparatus for receiving broadcast signals and methods for transmitting and receiving broadcast signals.

Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

SUMMARY OF THE INVENTION

Accordingly, the present invention is directed to an apparatus for transmitting broadcast signals and an apparatus for receiving broadcast signals for future broadcast services and methods for transmitting and receiving broadcast signals for future broadcast services.

An object of the present invention is to provide an apparatus and method for transmitting broadcast signals to multiplex data of a broadcast transmission/reception system providing two or more different broadcast services in a time domain and transmit the multiplexed data through the same RF signal bandwidth and an apparatus and method for receiving broadcast signals corresponding thereto.

Another object of the present invention is to provide an apparatus for transmitting broadcast signals, an apparatus for receiving broadcast signals and methods for transmitting and receiving broadcast signals to classify data corresponding to services by components, transmit data corresponding to each component as a data pipe, receive and process the data Still another object of the present invention is to provide an apparatus for transmitting broadcast signals, an apparatus for receiving broadcast signals and methods for transmitting and receiving broadcast signals to signal signaling information necessary to provide broadcast signals.

TECHNICAL SOLUTION

To achieve the object and other advantages and in accordance with the purpose of the invention, as embodied and broadly described herein, a method for transmitting broadcast signals comprises encoding service data corresponding to each of a plurality of data transmission path, wherein each of the data transmission path carries at least one service component, mapping the encoded service data onto constellations, encoding physical signaling data, building at least one signal frame including preamble data, the encoded physical signaling data, the mapped service data, wherein the preamble data is located before the encoded physical signaling data and the encoded physical signaling data is located before the mapped service data, modulating the at least one signal frame by an OFDM (Orthogonal Frequency Division Multiplex) scheme and transmitting the broadcast signals carrying the at least one modulated signal frame, wherein the broadcast signals includes channel information data, wherein the channel information data includes binding information between the service data and the data transmission path.

Advantageous Effects

The present invention can process data according to service characteristics to control QoS for each service or service component, thereby providing various broadcast services.

The present invention can achieve transmission flexibility by transmitting various broadcast services through the same RF signal bandwidth.

The present invention can improve data transmission efficiency and increase robustness of transmission/reception of broadcast signals using a MIMO system.

According to the present invention, it is possible to provide broadcast signal transmission and reception methods and apparatus capable of receiving digital broadcast signals without error even with mobile reception equipment or in an indoor environment.

BRIEF DESCRIPTION OF THE DRAWINGS

FIG. 21 illustrates field information included in a FAC transmitted by a broadcast signal transmitter according to one embodiment of the present invention.

FIG. 24 shows an exemplary table of FAC field information in a case in which a broadcast signal transmitter according to one embodiment transmits signal frame having the signal frame structure described above over an RF channel.

FIG. 25 shows an example of FAC field data that is actually transmitted in the case in which a broadcast signal transmitter according to one embodiment transmits a signal frame having the signal frame structure described above over an RF channel.

FIG. 26 is a flowchart illustrating a method for transmitting a broadcast signal according to one embodiment of the present invention.

FIG. 27 is a flowchart illustrating a method for receiving a broadcast signal according to one embodiment of the present invention.

DETAILED DESCRIPTION OF THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The apparatuses and methods for transmitting according to an embodiment of the present invention may be categorized into a base profile for the terrestrial broadcast service, a handheld profile for the mobile broadcast service and an advanced profile for the UHDTV service. In this case, the base profile can be used as a profile for both the terrestrial broadcast service and the mobile broadcast service. That is, the base profile can be used to define a concept of a profile which includes the mobile profile. This can be changed according to intention of the designer.

The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

Figure 1:
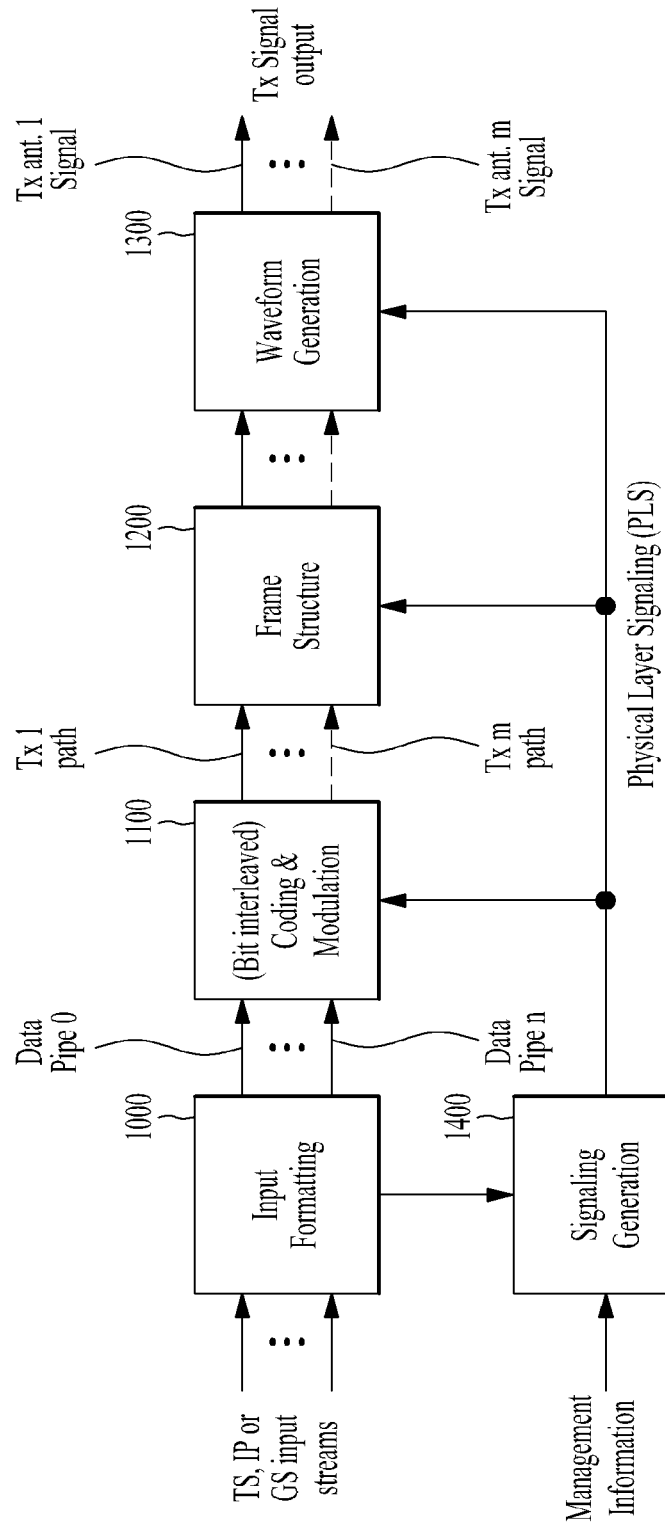
FIG. 1 illustrates a structure of an apparatus for transmitting broadcast signals for future broadcast services according to an embodiment of the present invention.

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting module 1000, a coding & modulation module 1100, a frame structure module 1200, a waveform generation module 1300 and a signaling generation module 1400. A description will be given of the operation of each module of the apparatus for transmitting broadcast signals.

Referring to FIG. 1, the apparatus for transmitting broadcast signals for future broadcast services according to an embodiment of the present invention can receive MPEG-TSs, IP streams (v4/v6) and generic streams (GSs) as an input signal. In addition, the apparatus for transmitting broadcast signals can receive management information about the configuration of each stream constituting the input signal and generate a final physical layer signal with reference to the received management information.

The input formatting module 1000 according to an embodiment of the present invention can classify the input streams on the basis of a standard for coding and modulation or services or service components and output the input streams as a plurality of logical data pipes (or data pipes or DP data). The data pipe is a logical channel in the physical layer that carries service data or related metadata, which may carry one or multiple service(s) or service component(s). In addition, data transmitted through each data pipe may be called DP data.

In addition, the input formatting module 1000 according to an embodiment of the present invention can divide each data pipe into blocks necessary to perform coding and modulation and carry out processes necessary to increase transmission efficiency or to perform scheduling. Details of operations of the input formatting module 1000 will be described later.

The coding & modulation module 1100 according to an embodiment of the present invention can perform forward error correction (FEC) encoding on each data pipe received from the input formatting module 1000 such that an apparatus for receiving broadcast signals can correct an error that may be generated on a transmission channel. In addition, the coding & modulation module 1100 according to an embodiment of the present invention can convert FEC output bit data to symbol data and interleave the symbol data to correct burst error caused by a channel. As shown in FIG. 1, the coding & modulation module 1100 according to an embodiment of the present invention can divide the processed data such that the divided data can be output through data paths for respective antenna outputs in order to transmit the data through two or more Tx antennas.

The frame structure module 1200 according to an embodiment of the present invention can map the data output from the coding & modulation module 1100 to signal frames. The frame structure module 1200 according to an embodiment of the present invention can perform mapping using scheduling information output from the input formatting module 1000 and interleave data in the signal frames in order to obtain additional diversity gain.

The waveform generation module 1300 according to an embodiment of the present invention can convert the signal frames output from the frame structure module 1200 into a signal for transmission. In this case, the waveform generation module 1300 according to an embodiment of the present invention can insert a preamble signal (or preamble) into the signal for detection of the transmission apparatus and insert a reference signal for estimating a transmission channel to compensate for distortion into the signal. In addition, the waveform generation module 1300 according to an embodiment of the present invention can provide a guard interval and insert a specific sequence into the same in order to offset the influence of channel delay spread due to multi-path reception. Additionally, the waveform generation module 1300 according to an embodiment of the present invention can perform a procedure necessary for efficient transmission in consideration of signal characteristics such as a peak-to-average power ratio of the output signal.

The signaling generation module 1400 according to an embodiment of the present invention generates final physical layer signaling information using the input management information and information generated by the input formatting module 1000, coding & modulation module 1100 and frame structure module 1200. Accordingly, a reception apparatus according to an embodiment of the present invention can decode a received signal by decoding the signaling information.

As described above, the apparatus for transmitting broadcast signals for future broadcast services according to one embodiment of the present invention can provide terrestrial broadcast service, mobile broadcast service, UHDTV service, etc. Accordingly, the apparatus for transmitting broadcast signals for future broadcast services according to one embodiment of the present invention can multiplex signals for different services in the time domain and transmit the same.

Figure 2:
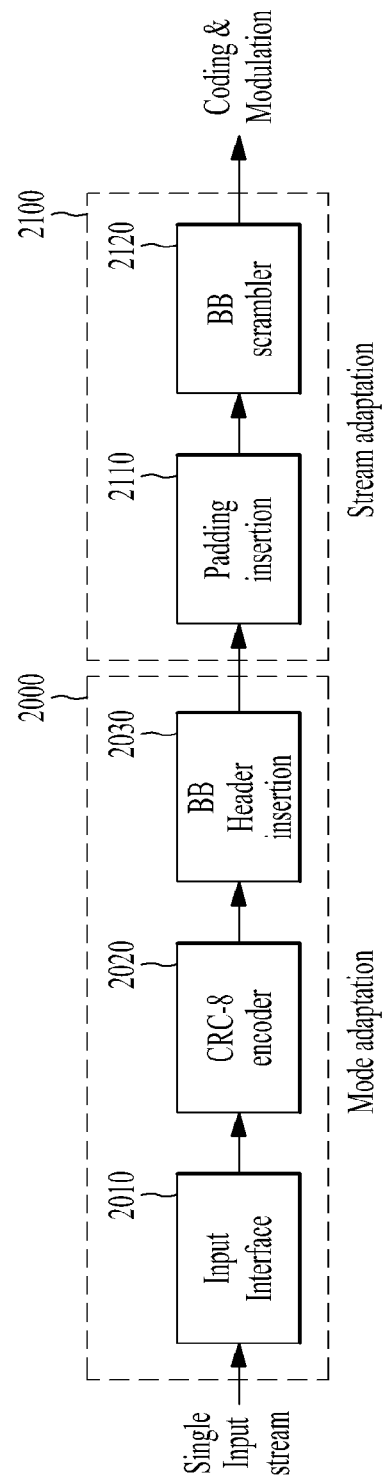
FIG. 2 illustrates an input formatting module according to an embodiment of the present invention.
Figure 3:
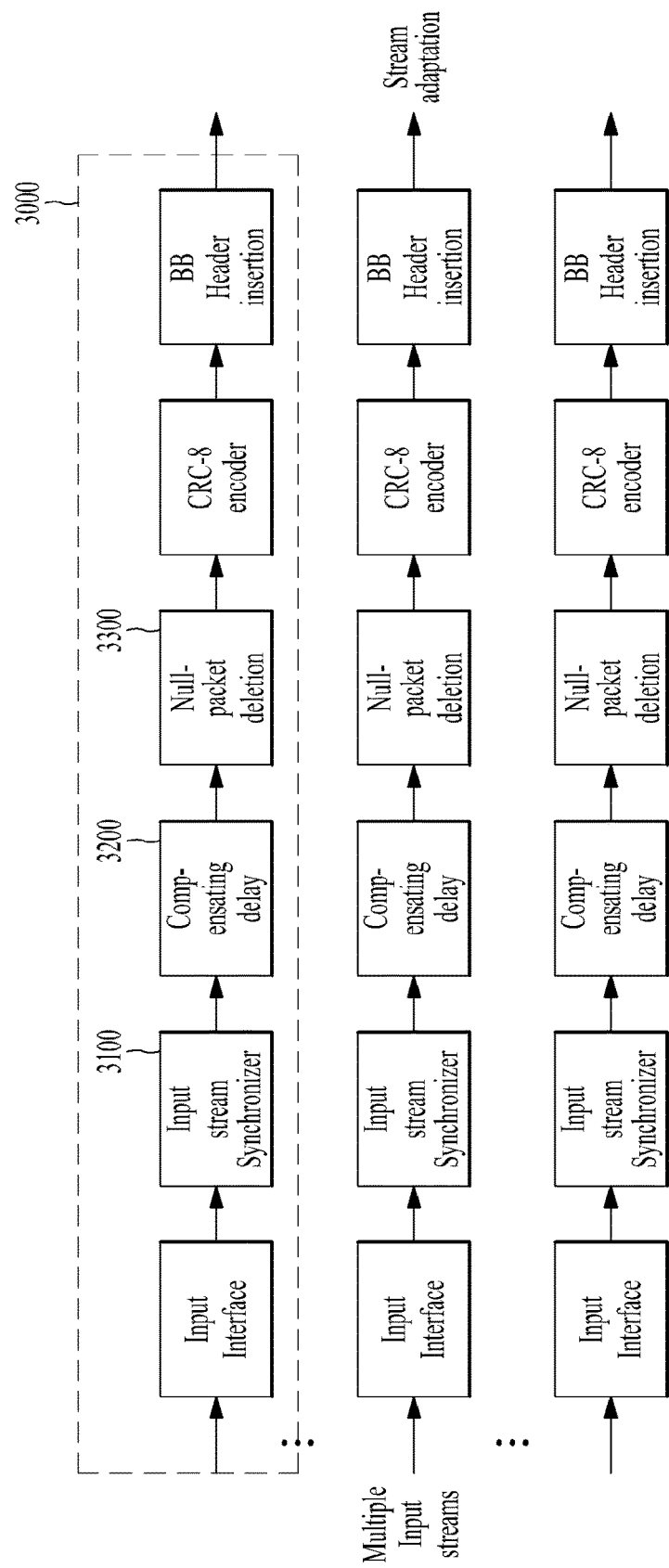
FIG. 3 illustrates an input formatting module according to another embodiment of the present invention.
Figure 4:
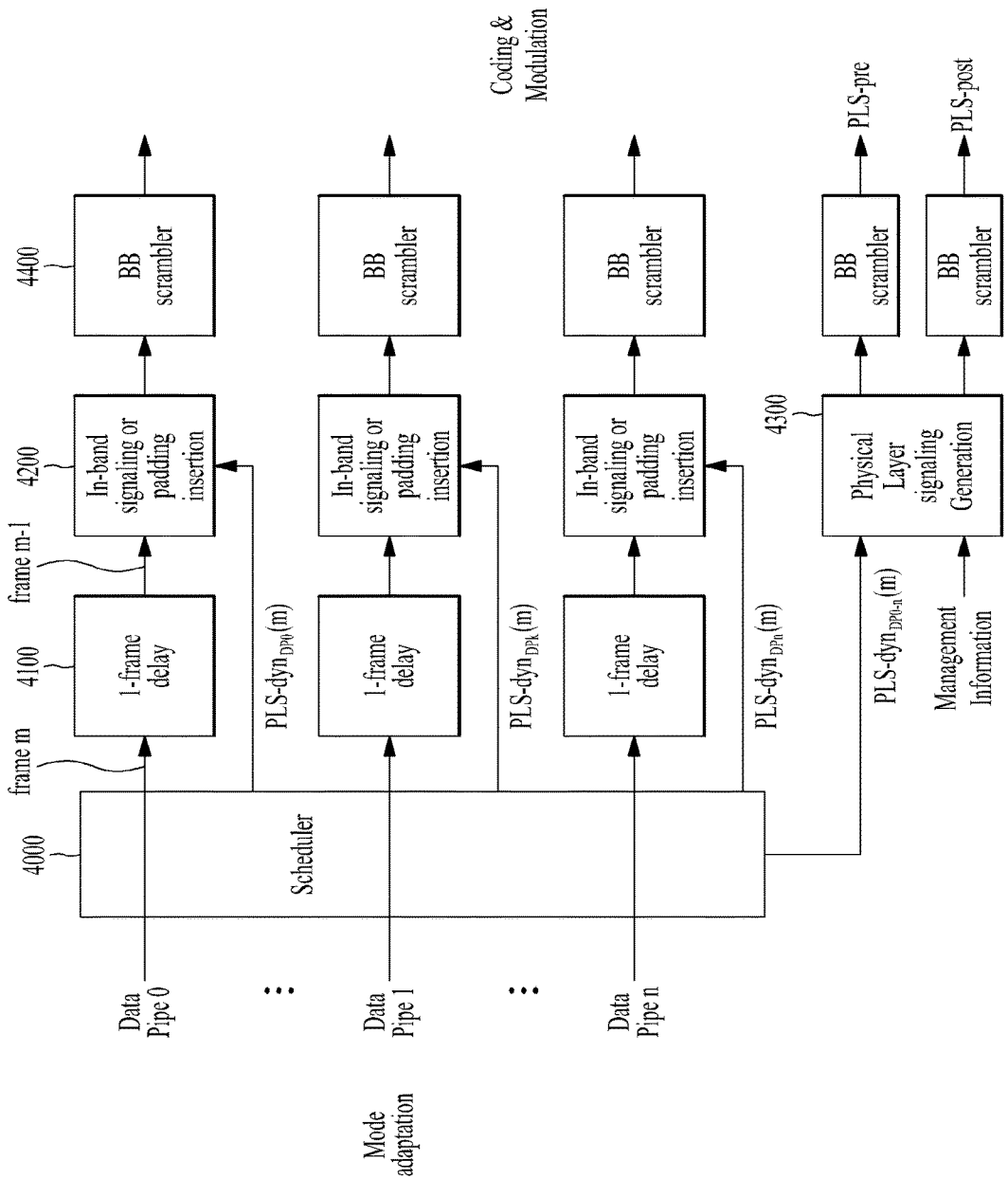
FIG. 4 illustrates an input formatting module according to another embodiment of the present invention.

FIGS. 2, 3 and 4 illustrate the input formatting module 1000 according to embodiments of the present invention. A description will be given of each figure.

FIG. 2 illustrates an input formatting module according to one embodiment of the present invention. FIG. 2 shows an input formatting module when the input signal is a single input stream.

Referring to FIG. 2, the input formatting module according to one embodiment of the present invention can include a mode adaptation module 2000 and a stream adaptation module 2100.

As shown in FIG. 2, the mode adaptation module 2000 can include an input interface block 2010, a CRC-8 encoder block 2020 and a BB header insertion block 2030. Description will be given of each block of the mode adaptation module 2000.

The input interface block 2010 can divide the single input stream input thereto into data pieces each having the length of a baseband (BB) frame used for FEC (BCH/LDPC) which will be performed later and output the data pieces.

The CRC-8 encoder block 2020 can perform CRC encoding on BB frame data to add redundancy data thereto.

The BB header insertion block 2030 can insert, into the BB frame data, a header including information such as mode adaptation type (TS/GS/IP), a user packet length, a data field length, user packet sync byte, start address of user packet sync byte in data field, a high efficiency mode indicator, an input stream synchronization field, etc.

As shown in FIG. 2, the stream adaptation module 2100 can include a padding insertion block 2110 and a BB scrambler block 2120. Description will be given of each block of the stream adaptation module 2100.

If data received from the mode adaptation module 2000 has a length shorter than an input data length necessary for FEC encoding, the padding insertion block 2110 can insert a padding bit into the data such that the data has the input data length and output the data including the padding bit.

The BB scrambler block 2120 can randomize the input bit stream by performing an XOR operation on the input bit stream and a pseudo random binary sequence (PRBS).

The above-described blocks may be omitted or replaced by blocks having similar or identical functions.

As shown in FIG. 2, the input formatting module can finally output data pipes to the coding & modulation module.

FIG. 3 illustrates an input formatting module according to another embodiment of the present invention. FIG. 3 shows a mode adaptation module 3000 of the input formatting module when the input signal corresponds to multiple input streams.

The mode adaptation module 3000 of the input formatting module for processing the multiple input streams can independently process the multiple input streams.

Referring to FIG. 3, the mode adaptation module 3000 for respectively processing the multiple input streams can include input interface blocks, input stream synchronizer blocks 3100, compensating delay blocks 3200, null packet deletion blocks 3300, CRC-8 encoder blocks and BB header insertion blocks. Description will be given of each block of the mode adaptation module 3000.

Operations of the input interface block, CRC-8 encoder block and BB header insertion block correspond to those of the input interface block, CRC-8 encoder block and BB header insertion block described with reference to FIG. 2 and thus description thereof is omitted.

The input stream synchronizer block 3100 can transmit input stream clock reference (ISCR) information to generate timing information necessary for the apparatus for receiving broadcast signals to restore the TSs or GSs.

The compensating delay block 3200 can delay input data and output the delayed input data such that the apparatus for receiving broadcast signals can synchronize the input data if a delay is generated between data pipes according to processing of data including the timing information by the transmission apparatus.

The null packet deletion block 3300 can delete unnecessarily transmitted input null packets from the input data, insert the number of deleted null packets into the input data based on positions in which the null packets are deleted and transmit the input data.

The above-described blocks may be omitted or replaced by blocks having similar or identical functions.

FIG. 4 illustrates an input formatting module according to another embodiment of the present invention.

Specifically, FIG. 4 illustrates a stream adaptation module of the input formatting module when the input signal corresponds to multiple input streams.

The stream adaptation module of the input formatting module when the input signal corresponds to multiple input streams can include a scheduler 4000, a 1-frame delay block 4100, an in-band signaling or padding insertion block 4200, a physical layer signaling generation block 4300 and a BB scrambler block 4400. Description will be given of each block of the stream adaptation module.

The scheduler 4000 can perform scheduling for a MIMO system using multiple antennas having dual polarity. In addition, the scheduler 4000 can generate parameters for use in signal processing blocks for antenna paths, such as a bit-to-cell demux block, a cell interleaver block, a time interleaver block, etc. included in the coding & modulation module illustrated in FIG. 1.

The 1-frame delay block 4100 can delay the input data by one transmission frame such that scheduling information about the next frame can be transmitted through the current frame for in-band signaling information to be inserted into the data pipes.

The in-band signaling or padding insertion block 4200 can insert undelayed physical layer signaling (PLS)-dynamic signaling information into the data delayed by one transmission frame. In this case, the in-band signaling or padding insertion block 4200 can insert a padding bit when a space for padding is present or insert in-band signaling information into the padding space. In addition, the scheduler 4000 can output physical layer signaling-dynamic signaling information about the current frame separately from in-band signaling information. Accordingly, a cell mapper, which will be described later, can map input cells according to scheduling information output from the scheduler 4000.

The physical layer signaling generation block 4300 can generate physical layer signaling data which will be transmitted through a preamble symbol of a transmission frame or spread and transmitted through a data symbol other than the in-band signaling information. In this case, the physical layer signaling data according to an embodiment of the present invention can be referred to as signaling information. Furthermore, the physical layer signaling data according to an embodiment of the present invention can be divided into PLS-pre information and PLS-post information. The PLS-pre information can include parameters necessary to encode the PLS-post information and static PLS signaling data and the PLS-post information can include parameters necessary to encode the data pipes. The parameters necessary to encode the data pipes can be classified into static PLS signaling data and dynamic PLS signaling data. The static PLS signaling data is a parameter commonly applicable to all frames included in a super-frame and can be changed on a super-frame basis. The dynamic PLS signaling data is a parameter differently applicable to respective frames included in a super-frame and can be changed on a frame-by-frame basis. Accordingly, the reception apparatus can acquire the PLS-post information by decoding the PLS-pre information and decode desired data pipes by decoding the PLS-post information.

The BB scrambler block 4400 can generate a pseudo-random binary sequence (PRBS) and perform an XOR operation on the PRBS and the input bit streams to decrease the peak-to-average power ratio (PAPR) of the output signal of the waveform generation block. As shown in FIG. 4, scrambling of the BB scrambler block 4400 is applicable to both data pipes and physical layer signaling information.

The above-described blocks may be omitted or replaced by blocks having similar or identical functions according to designer.

As shown in FIG. 4, the stream adaptation module can finally output the data pipes to the coding & modulation module.

Figure 5:
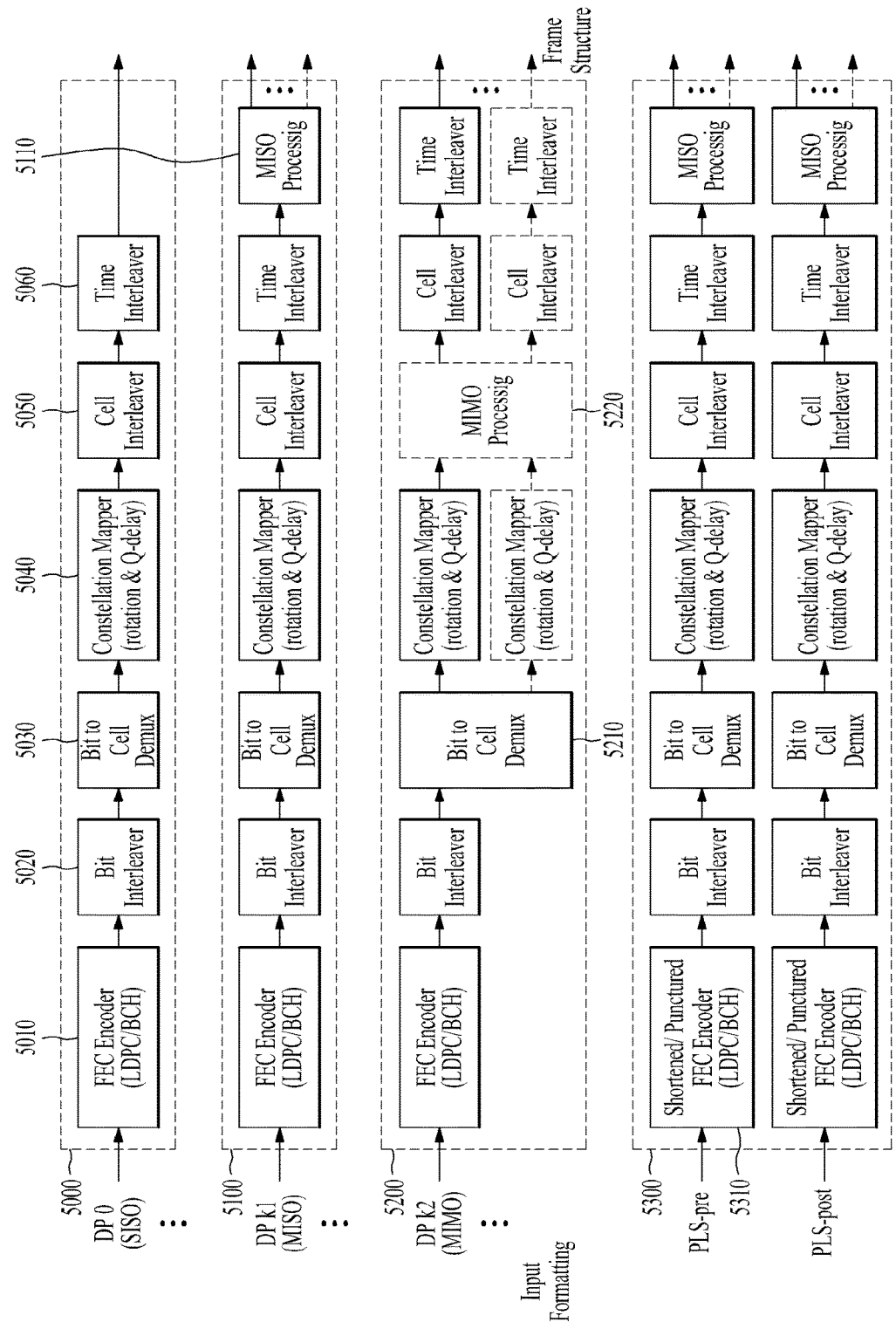
FIG. 5 illustrates a coding & modulation module according to an embodiment of the present invention.

FIG. 5 illustrates a coding & modulation module according to an embodiment of the present invention.

The coding & modulation module shown in FIG. 5 corresponds to an embodiment of the coding & modulation module illustrated in FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the coding & modulation module according to an embodiment of the present invention can independently process data pipes input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each data pipe.

Accordingly, the coding & modulation module according to an embodiment of the present invention can include a first block 5000 for SISO, a second block 5100 for MISO, a third block 5200 for MIMO and a fourth block 5300 for processing the PLS-pre/PLS-post information. The coding & modulation module illustrated in FIG. 5 is an exemplary and may include only the first block 5000 and the fourth block 5300, the second block 5100 and the fourth block 5300 or the third block 5200 and the fourth block 5300 according to design. That is, the coding & modulation module can include blocks for processing data pipes equally or differently according to design.

A description will be given of each block of the coding & modulation module.

The first block 5000 processes an input data pipe according to SISO and can include an FEC encoder block 5010, a bit interleaver block 5020, a bit-to-cell demux block 5030, a constellation mapper block 5040, a cell interleaver block 5050 and a time interleaver block 5060.

The FEC encoder block 5010 can perform BCH encoding and LDPC encoding on the input data pipe to add redundancy thereto such that the reception apparatus can correct an error generated on a transmission channel.

The bit interleaver block 5020 can interleave bit streams of the FEC-encoded data pipe according to an interleaving rule such that the bit streams have robustness against burst error that may be generated on the transmission channel. Accordingly, when deep fading or erasure is applied to QAM symbols, errors can be prevented from being generated in consecutive bits from among all codeword bits since interleaved bits are mapped to the QAM symbols.

The bit-to-cell demux block 5030 can determine the order of input bit streams such that each bit in an FEC block can be transmitted with appropriate robustness in consideration of both the order of input bit streams and a constellation mapping rule.

In addition, the bit interleaver block 5020 is located between the FEC encoder block 5010 and the constellation mapper block 5040 and can connect output bits of LDPC encoding performed by the FEC encoder block 5010 to bit positions having different reliability values and optimal values of the constellation mapper in consideration of LDPC decoding of the apparatus for receiving broadcast signals. Accordingly, the bit-to-cell demux block 5030 can be replaced by a block having a similar or equal function.

The constellation mapper block 5040 can map a bit word input thereto to one constellation. In this case, the constellation mapper block 5040 can additionally perform rotation & Q-delay. That is, the constellation mapper block 5040 can rotate input constellations according to a rotation angle, divide the constellations into an in-phase component and a quadrature-phase component and delay only the quadrature-phase component by an arbitrary value. Then, the constellation mapper block 5040 can remap the constellations to new constellations using a paired in-phase component and quadrature-phase component.

In addition, the constellation mapper block 5040 can move constellation points on a two-dimensional plane in order to find optimal constellation points. Through this process, capacity of the coding & modulation module 1100 can be optimized. Furthermore, the constellation mapper block 5040 can perform the above-described operation using IQ-balanced constellation points and rotation. The constellation mapper block 5040 can be replaced by a block having a similar or equal function.

The cell interleaver block 5050 can randomly interleave cells corresponding to one FEC block and output the interleaved cells such that cells corresponding to respective FEC blocks can be output in different orders.

The time interleaver block 5060 can interleave cells belonging to a plurality of FEC blocks and output the interleaved cells. Accordingly, the cells corresponding to the FEC blocks are dispersed and transmitted in a period corresponding to a time interleaving depth and thus diversity gain can be obtained.

The second block 5100 processes an input data pipe according to MISO and can include the FEC encoder block, bit interleaver block, bit-to-cell demux block, constellation mapper block, cell interleaver block and time interleaver block in the same manner as the first block 5000. However, the second block 5100 is distinguished from the first block 5000 in that the second block 5100 further includes a MISO processing block 5110. The second block 5100 performs the same procedure including the input operation to the time interleaver operation as those of the first block 5000 and thus description of the corresponding blocks is omitted.

The MISO processing block 5110 can encode input cells according to a MISO encoding matrix providing transmit diversity and output MISO-processed data through two paths. MISO processing according to one embodiment of the present invention can include OSTBC (orthogonal space time block coding)/OSFBC (orthogonal space frequency block coding, Alamouti coding).

The third block 5200 processes an input data pipe according to MIMO and can include the FEC encoder block, bit interleaver block, bit-to-cell demux block, constellation mapper block, cell interleaver block and time interleaver block in the same manner as the second block 5100, as shown in FIG. 5. However, the data processing procedure of the third block 5200 is different from that of the second block 5100 since the third block 5200 includes a MIMO processing block 5220.

That is, in the third block 5200, basic roles of the FEC encoder block and the bit interleaver block are identical to those of the first and second blocks 5000 and 5100 although functions thereof may be different from those of the first and second blocks 5000 and 5100.

The bit-to-cell demux block 5210 can generate as many output bit streams as input bit streams of MIMO processing and output the output bit streams through MIMO paths for MIMO processing. In this case, the bit-to-cell demux block 5210 can be designed to optimize the decoding performance of the reception apparatus in consideration of characteristics of LDPC and MIMO processing.

Basic roles of the constellation mapper block, cell interleaver block and time interleaver block are identical to those of the first and second blocks 5000 and 5100 although functions thereof may be different from those of the first and second blocks 5000 and 5100. As shown in FIG. 5, as many constellation mapper blocks, cell interleaver blocks and time interleaver blocks as the number of MIMO paths for MIMO processing can be present. In this case, the constellation mapper blocks, cell interleaver blocks and time interleaver blocks can operate equally or independently for data input through the respective paths.

The MIMO processing block 5220 can perform MIMO processing on two input cells using a MIMO encoding matrix and output the MIMO-processed data through two paths. The MIMO encoding matrix according to an embodiment of the present invention can include spatial multiplexing, Golden code, full-rate full diversity code, linear dispersion code, etc.

The fourth block 5300 processes the PLS-pre/PLS-post information and can perform SISO or MISO processing.

The basic roles of the bit interleaver block, bit-to-cell demux block, constellation mapper block, cell interleaver block, time interleaver block and MISO processing block included in the fourth block 5300 correspond to those of the second block 5100 although functions thereof may be different from those of the second block 5100.

A shortened/punctured FEC encoder block 5310 included in the fourth block 5300 can process PLS data using an FEC encoding scheme for a PLS path provided for a case in which the length of input data is shorter than a length necessary to perform FEC encoding. Specifically, the shortened/punctured FEC encoder block 5310 can perform BCH encoding on input bit streams, pad 0s corresponding to a desired input bit stream length necessary for normal LDPC encoding, carry out LDPC encoding and then remove the padded 0s to puncture parity bits such that an effective code rate becomes equal to or lower than the data pipe rate.

The blocks included in the first block 5000 to fourth block 5300 may be omitted or replaced by blocks having similar or identical functions according to design.

As illustrated in FIG. 5, the coding & modulation module can output the data pipes (or DP data), PLS-pre information and PLS-post information processed for the respective paths to the frame structure module.

Figure 6:
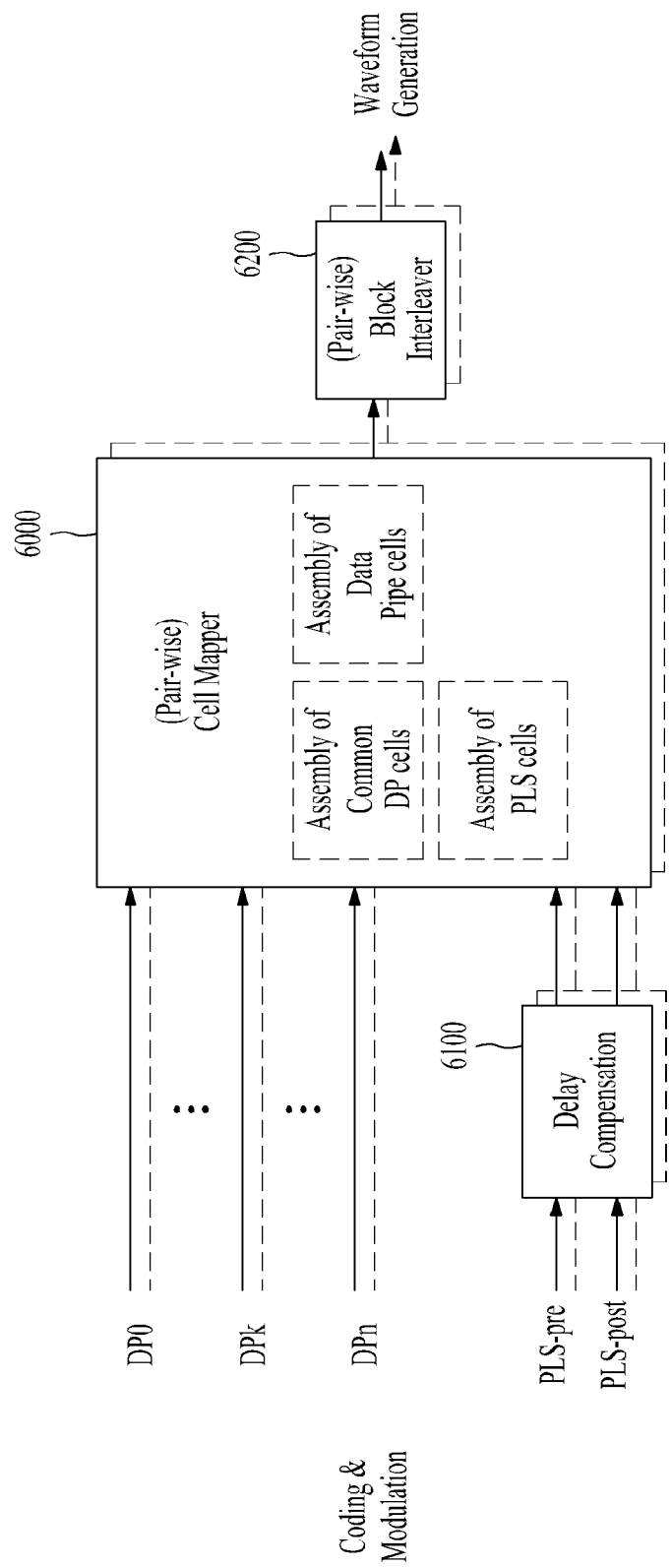
FIG. 6 illustrates a frame structure module according to an embodiment of the present invention.

FIG. 6 illustrates a frame structure module according to one embodiment of the present invention.

The frame structure module shown in FIG. 6 corresponds to an embodiment of the frame structure module 1200 illustrated in FIG. 1.

The frame structure module according to one embodiment of the present invention can include at least one cell-mapper 6000, at least one delay compensation module 6100 and at least one block interleaver 6200. The number of cell mappers 6000, delay compensation modules 6100 and block interleavers 6200 can be changed. A description will be given of each module of the frame structure block.

The cell-mapper 6000 can allocate cells corresponding to SISO-, MISO- or MIMO-processed data pipes output from the coding & modulation module, cells corresponding to common data commonly applicable to the data pipes and cells corresponding to the PLS-pre/PLS-post information to signal frames according to scheduling information. The common data refers to signaling information commonly applied to all or some data pipes and can be transmitted through a specific data pipe. The data pipe through which the common data is transmitted can be referred to as a common data pipe and can be changed according to design.

When the apparatus for transmitting broadcast signals according to an embodiment of the present invention uses two output antennas and Alamouti coding is used for MISO processing, the cell-mapper 6000 can perform pair-wise cell mapping in order to maintain orthogonality according to Alamouti encoding. That is, the cell-mapper 6000 can process two consecutive cells of the input cells as one unit and map the unit to a frame. Accordingly, paired cells in an input path corresponding to an output path of each antenna can be allocated to neighboring positions in a transmission frame.

The delay compensation block 6100 can obtain PLS data corresponding to the current transmission frame by delaying input PLS data cells for the next transmission frame by one frame. In this case, the PLS data corresponding to the current frame can be transmitted through a preamble part in the current signal frame and PLS data corresponding to the next signal frame can be transmitted through a preamble part in the current signal frame or in-band signaling in each data pipe of the current signal frame. This can be changed by the designer.

The block interleaver 6200 can obtain additional diversity gain by interleaving cells in a transport block corresponding to the unit of a signal frame. In addition, the block interleaver 6200 can perform interleaving by processing two consecutive cells of the input cells as one unit when the above-described pair-wise cell mapping is performed. Accordingly, cells output from the block interleaver 6200 can be two consecutive identical cells.

When pair-wise mapping and pair-wise interleaving are performed, at least one cell mapper and at least one block interleaver can operate equally or independently for data input through the paths.

The above-described blocks may be omitted or replaced by blocks having similar or identical functions according to design.

As illustrated in FIG. 6, the frame structure module can output at least one signal frame to the waveform generation module.

Figure 7:
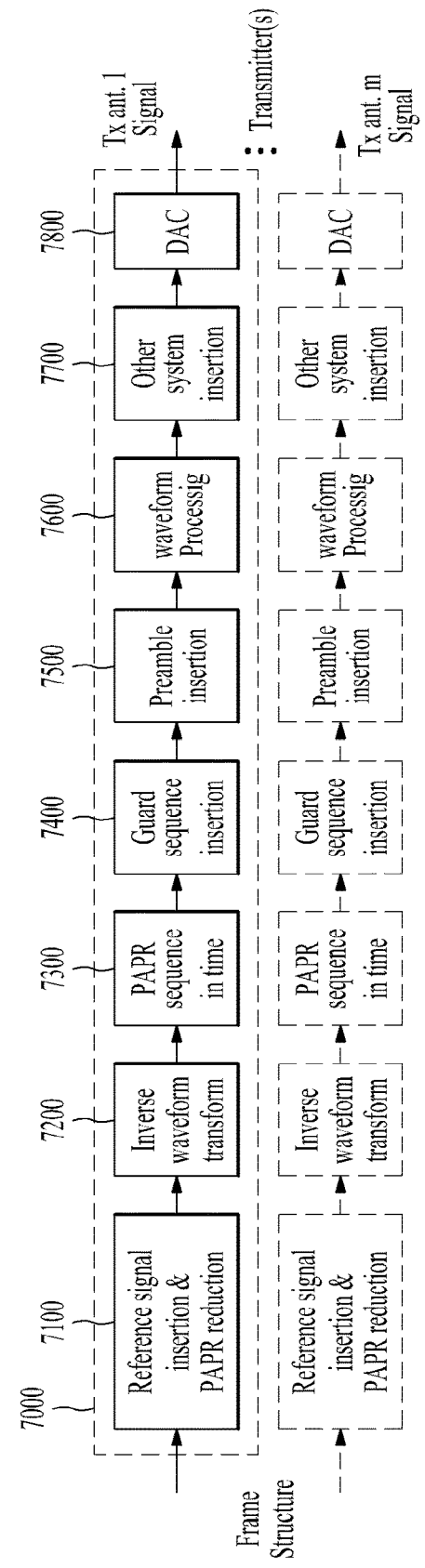
FIG. 7 illustrates a waveform generation module according to an embodiment of the present invention.

FIG. 7 illustrates a waveform generation module according to an embodiment of the present invention.

The waveform generation module illustrated in FIG. 7 corresponds to an embodiment of the waveform generation module 1300 described with reference to FIG. 1.

The waveform generation module according to an embodiment of the present invention can modulate and transmit as many signal frames as the number of antennas for receiving and outputting signal frames output from the frame structure module illustrated in FIG. 6.

Specifically, the waveform generation module illustrated in FIG. 7 is an embodiment of a waveform generation module of an apparatus for transmitting broadcast signals using m Tx antennas and can include m processing blocks for modulating and outputting frames corresponding to m paths. The m processing blocks can perform the same processing procedure. A description will be given of operation of the first processing block 7000 from among the m processing blocks.

The first processing block 7000 can include a reference signal & PAPR reduction block 7100, an inverse waveform transform block 7200, a PAPR reduction in time block 7300, a guard sequence insertion block 7400, a preamble insertion block 7500, a waveform processing block 7600, other system insertion block 7700 and a DAC (digital analog converter) block 7800.

The reference signal insertion & PAPR reduction block 7100 can insert a reference signal into a predetermined position of each signal block and apply a PAPR reduction scheme to reduce a PAPR in the time domain. If a broadcast transmission/reception system according to an embodiment of the present invention corresponds to an OFDM system, the reference signal insertion & PAPR reduction block 7100 can use a method of reserving some active subcarriers rather than using the same. In addition, the reference signal insertion & PAPR reduction block 7100 may not use the PAPR reduction scheme as an optional feature according to broadcast transmission/reception system.

The inverse waveform transform block 7200 can transform an input signal in a manner of improving transmission efficiency and flexibility in consideration of transmission channel characteristics and system architecture. If the broadcast transmission/reception system according to an embodiment of the present invention corresponds to an OFDM system, the inverse waveform transform block 7200 can employ a method of transforming a frequency domain signal into a time domain signal through inverse FFT operation. If the broadcast transmission/reception system according to an embodiment of the present invention corresponds to a single carrier system, the inverse waveform transform block 7200 may not be used in the waveform generation module.

The PAPR reduction in time block 7300 can use a method for reducing PAPR of an input signal in the time domain. If the broadcast transmission/reception system according to an embodiment of the present invention corresponds to an OFDM system, the PAPR reduction in time block 7300 may use a method of simply clipping peak amplitude. Furthermore, the PAPR reduction in time block 7300 may not be used in the broadcast transmission/reception system according to an embodiment of the present invention since it is an optional feature.

The guard sequence insertion block 7400 can provide a guard interval between neighboring signal blocks and insert a specific sequence into the guard interval as necessary in order to minimize the influence of delay spread of a transmission channel. Accordingly, the reception apparatus can easily perform synchronization or channel estimation. If the broadcast transmission/reception system according to an embodiment of the present invention corresponds to an OFDM system, the guard sequence insertion block 7400 may insert a cyclic prefix into a guard interval of an OFDM symbol.

The preamble insertion block 7500 can insert a signal of a known type (e.g. the preamble or preamble symbol) agreed upon between the transmission apparatus and the reception apparatus into a transmission signal such that the reception apparatus can rapidly and efficiently detect a target system signal. If the broadcast transmission/reception system according to an embodiment of the present invention corresponds to an OFDM system, the preamble insertion block 7500 can define a signal frame composed of a plurality of OFDM symbols and insert a preamble symbol into the beginning of each signal frame. That is, the preamble carries basic PLS data and is located in the beginning of a signal frame.

The waveform processing block 7600 can perform waveform processing on an input baseband signal such that the input baseband signal meets channel transmission characteristics. The waveform processing block 7600 may use a method of performing square-root-raised cosine (SRRC) filtering to obtain a standard for out-of-band emission of a transmission signal. If the broadcast transmission/reception system according to an embodiment of the present invention corresponds to a multi-carrier system, the waveform processing block 7600 may not be used.

The other system insertion block 7700 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 7800 can convert an input digital signal into an analog signal and output the analog signal. The signal output from the DAC block 7800 can be transmitted through m output antennas. A Tx antenna according to an embodiment of the present invention can have vertical or horizontal polarity.

The above-described blocks may be omitted or replaced by blocks having similar or identical functions according to design.

Figure 8:
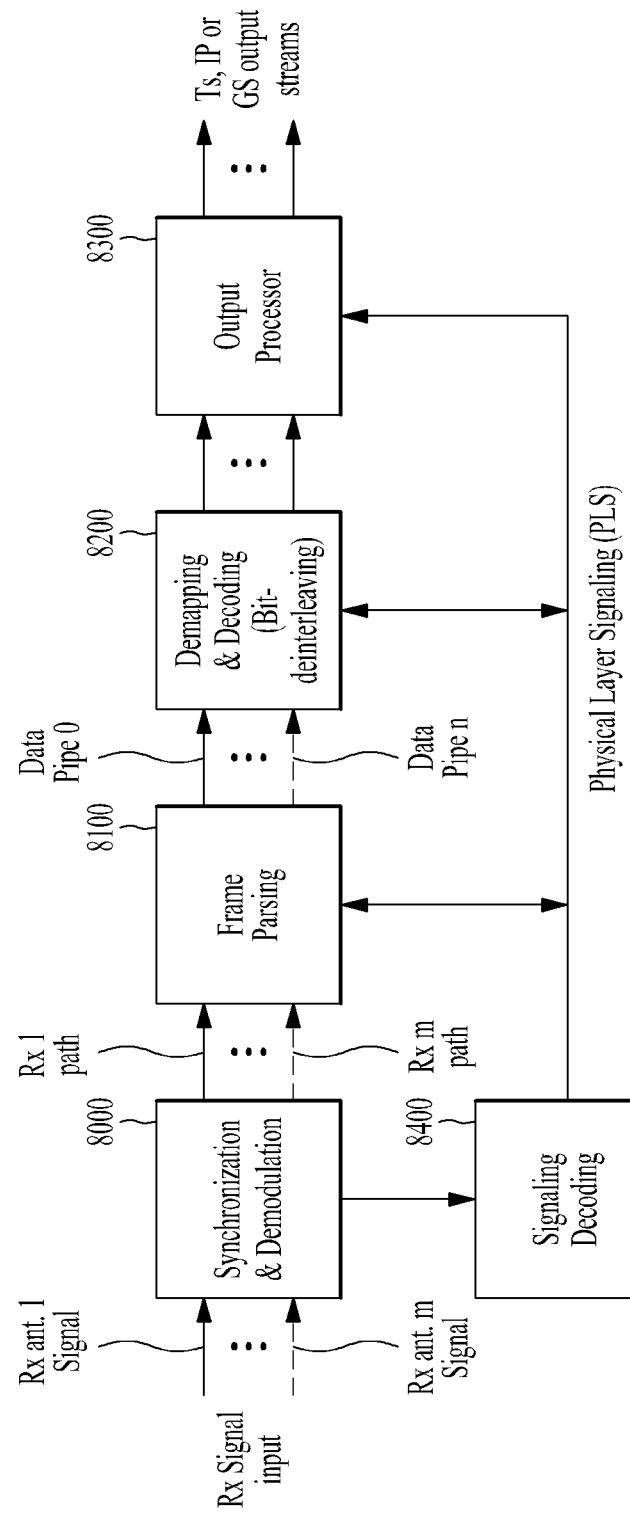
FIG. 8 illustrates a structure of an apparatus for receiving broadcast signals for future broadcast services according to an embodiment of the present invention.

FIG. 8 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1. The apparatus for receiving broadcast signals for future broadcast services according to an embodiment of the present invention can include a synchronization & demodulation module 8000, a frame parsing module 8100, a demapping & decoding module 8200, an output processor 8300 and a signaling decoding module 8400. A description will be given of operation of each module of the apparatus for receiving broadcast signals.

The synchronization & demodulation module 8000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 8100 can parse input signal frames and extract data through which a service selected by a user is transmitted. If the apparatus for transmitting broadcast signals performs interleaving, the frame parsing module 8100 can carry out deinterleaving corresponding to a reverse procedure of interleaving. In this case, the positions of a signal and data that need to be extracted can be obtained by decoding data output from the signaling decoding module 8400 to restore scheduling information generated by the apparatus for transmitting broadcast signals.

The demapping & decoding module 8200 can convert the input signals into bit domain data and then deinterleave the same as necessary. The demapping & decoding module 8200 can perform demapping for mapping applied for transmission efficiency and correct an error generated on a transmission channel through decoding. In this case, the demapping & decoding module 8200 can obtain transmission parameters necessary for demapping and decoding by decoding the data output from the signaling decoding module 8400.

The output processor 8300 can perform reverse procedures of various compression/signal processing procedures which are applied by the apparatus for transmitting broadcast signals to improve transmission efficiency. In this case, the output processor 8300 can acquire necessary control information from data output from the signaling decoding module 8400. The output of the output processor 8300 corresponds to a signal input to the apparatus for transmitting broadcast signals and may be MPEG-TSs, IP streams (v4 or v6) and generic streams.

The signaling decoding module 8400 can obtain PLS information from the signal demodulated by the synchronization & demodulation module 8000. As described above, the frame parsing module 8100, demapping & decoding module 8200 and output processor 8300 can execute functions thereof using the data output from the signaling decoding module 8400.

Figure 9:
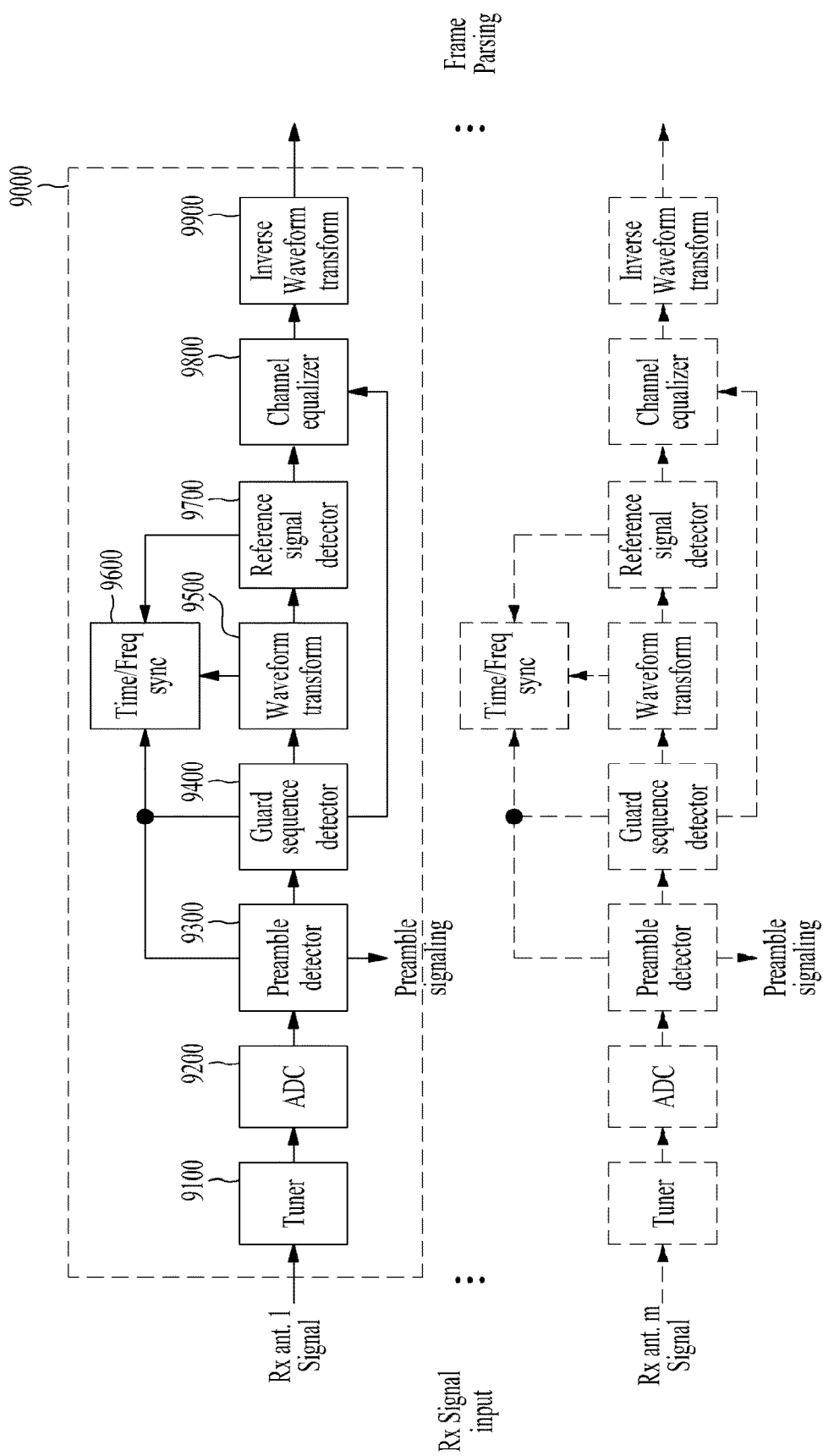
FIG. 9 illustrates a synchronization & demodulation module according to an embodiment of the present invention.

FIG. 9 illustrates a synchronization & demodulation module according to an embodiment of the present invention.

The synchronization & demodulation module shown in FIG. 9 corresponds to an embodiment of the synchronization & demodulation module described with reference to FIG. 8. The synchronization & demodulation module shown in FIG. 9 can perform a reverse operation of the operation of the waveform generation module illustrated in FIG. 7.

As shown in FIG. 9, the synchronization & demodulation module according to an embodiment of the present invention corresponds to a synchronization & demodulation module of an apparatus for receiving broadcast signals using m Rx antennas and can include m processing blocks for demodulating signals respectively input through m paths. The m processing blocks can perform the same processing procedure. A description will be given of operation of the first processing block 9000 from among the m processing blocks.

The first processing block 9000 can include a tuner 9100, an ADC block 9200, a preamble detector 9300, a guard sequence detector 9400, a waveform transform block 9500, a time/frequency synchronization block 9600, a reference signal detector 9700, a channel equalizer 9800 and an inverse waveform transform block 9900.

The tuner 9100 can select a desired frequency band, compensate for the magnitude of a received signal and output the compensated signal to the ADC block 9200.

The ADC block 9200 can convert the signal output from the tuner 9100 into a digital signal.

The preamble detector 9300 can detect a preamble (or preamble signal or preamble symbol) in order to check whether or not the digital signal is a signal of the system corresponding to the apparatus for receiving broadcast signals. In this case, the preamble detector 9300 can decode basic transmission parameters received through the preamble.

The guard sequence detector 9400 can detect a guard sequence in the digital signal. The time/frequency synchronization block 9600 can perform time/frequency synchronization using the detected guard sequence and the channel equalizer 9800 can estimate a channel through a received/restored sequence using the detected guard sequence.

The waveform transform block 9500 can perform a reverse operation of inverse waveform transform when the apparatus for transmitting broadcast signals has performed inverse waveform transform. When the broadcast transmission/reception system according to one embodiment of the present invention is a multi-carrier system, the waveform transform block 9500 can perform FFT. Furthermore, when the broadcast transmission/reception system according to an embodiment of the present invention is a single carrier system, the waveform transform block 9500 may not be used if a received time domain signal is processed in the frequency domain or processed in the time domain.

The time/frequency synchronization block 9600 can receive output data of the preamble detector 9300, guard sequence detector 9400 and reference signal detector 9700 and perform time synchronization and carrier frequency synchronization including guard sequence detection and block window positioning on a detected signal. Here, the time/frequency synchronization block 9600 can feed back the output signal of the waveform transform block 9500 for frequency synchronization.

The reference signal detector 9700 can detect a received reference signal. Accordingly, the apparatus for receiving broadcast signals according to an embodiment of the present invention can perform synchronization or channel estimation.

The channel equalizer 9800 can estimate a transmission channel from each Tx antenna to each Rx antenna from the guard sequence or reference signal and perform channel equalization for received data using the estimated channel.

The inverse waveform transform block 9900 may restore the original received data domain when the waveform transform block 9500 performs waveform transform for efficient synchronization and channel estimation/equalization. If the broadcast transmission/reception system according to an embodiment of the present invention is a single carrier system, the waveform transform block 9500 can perform FFT in order to carry out synchronization/channel estimation/equalization in the frequency domain and the inverse waveform transform block 9900 can perform IFFT on the channel-equalized signal to restore transmitted data symbols. If the broadcast transmission/reception system according to an embodiment of the present invention is a multi-carrier system, the inverse waveform transform block 9900 may not be used.

The above-described blocks may be omitted or replaced by blocks having similar or identical functions according to design.

Figure 10:
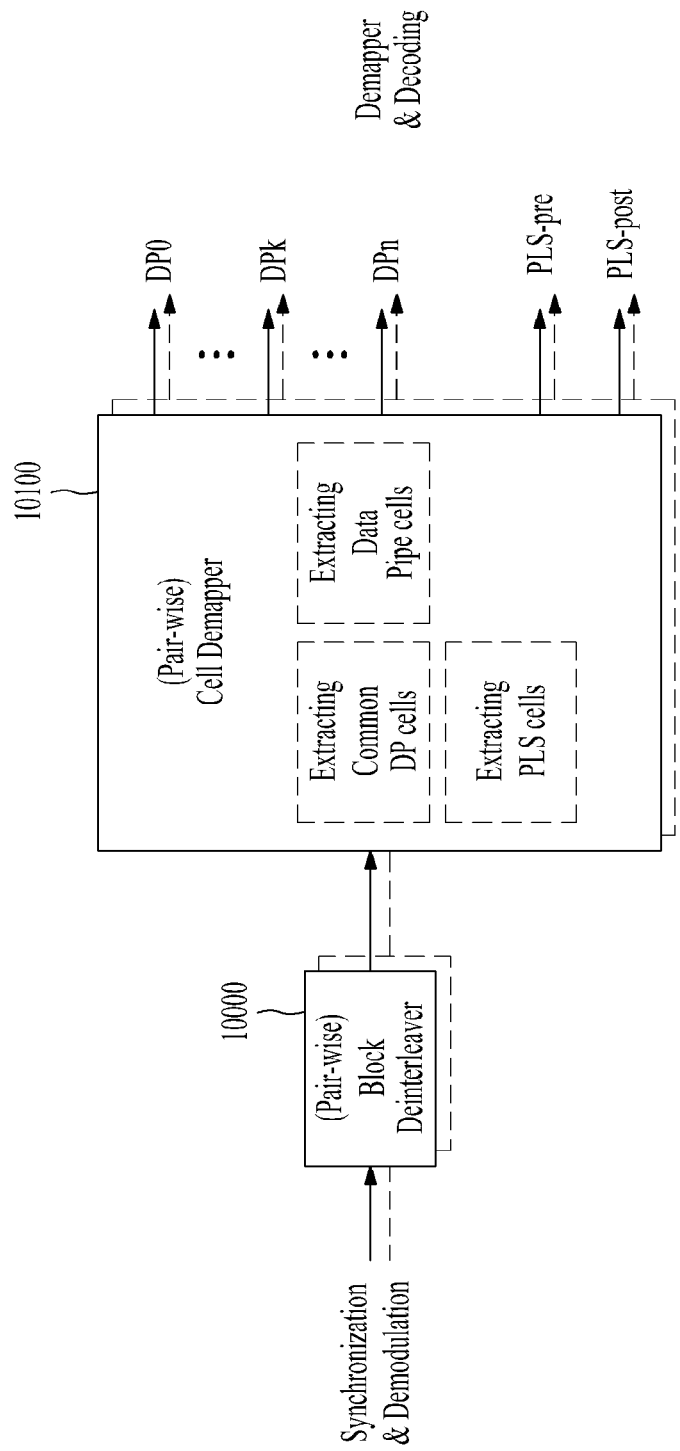
FIG. 10 illustrates a frame parsing module according to an embodiment of the present invention.

FIG. 10 illustrates a frame parsing module according to an embodiment of the present invention.

The frame parsing module illustrated in FIG. 10 corresponds to an embodiment of the frame parsing module described with reference to FIG. 8. The frame parsing module shown in FIG. 10 can perform a reverse operation of the operation of the frame structure module illustrated in FIG. 6.

As shown in FIG. 10, the frame parsing module according to an embodiment of the present invention can include at least one block deinterleaver 10000 and at least one cell demapper 10100.

The block deinterleaver 10000 can deinterleave data input through data paths of the m Rx antennas and processed by the synchronization & demodulation module on a signal block basis. In this case, if the apparatus for transmitting broadcast signals performs pair-wise interleaving as illustrated in FIG. 8, the block deinterleaver 10000 can process two consecutive pieces of data as a pair for each input path. Accordingly, the block interleaver 10000 can output two consecutive pieces of data even when deinterleaving has been performed. Furthermore, the block deinterleaver 10000 can perform a reverse operation of the interleaving operation performed by the apparatus for transmitting broadcast signals to output data in the original order.

The cell demapper 10100 can extract cells corresponding to common data, cells corresponding to data pipes and cells corresponding to PLS data from received signal frames. The cell demapper 10100 can merge data distributed and transmitted and output the same as a stream as necessary. When two consecutive pieces of cell input data are processed as a pair and mapped in the apparatus for transmitting broadcast signals, as shown in FIG. 6, the cell demapper 10100 can perform pair-wise cell demapping for processing two consecutive input cells as one unit as a reverse procedure of the mapping operation of the apparatus for transmitting broadcast signals.

In addition, the cell demapper 10100 can extract PLS signaling data received through the current frame as PLS-pre & PLS-post data and output the PLS-pre & PLS-post data.

The above-described blocks may be omitted or replaced by blocks having similar or identical functions according to design.

Figure 11:
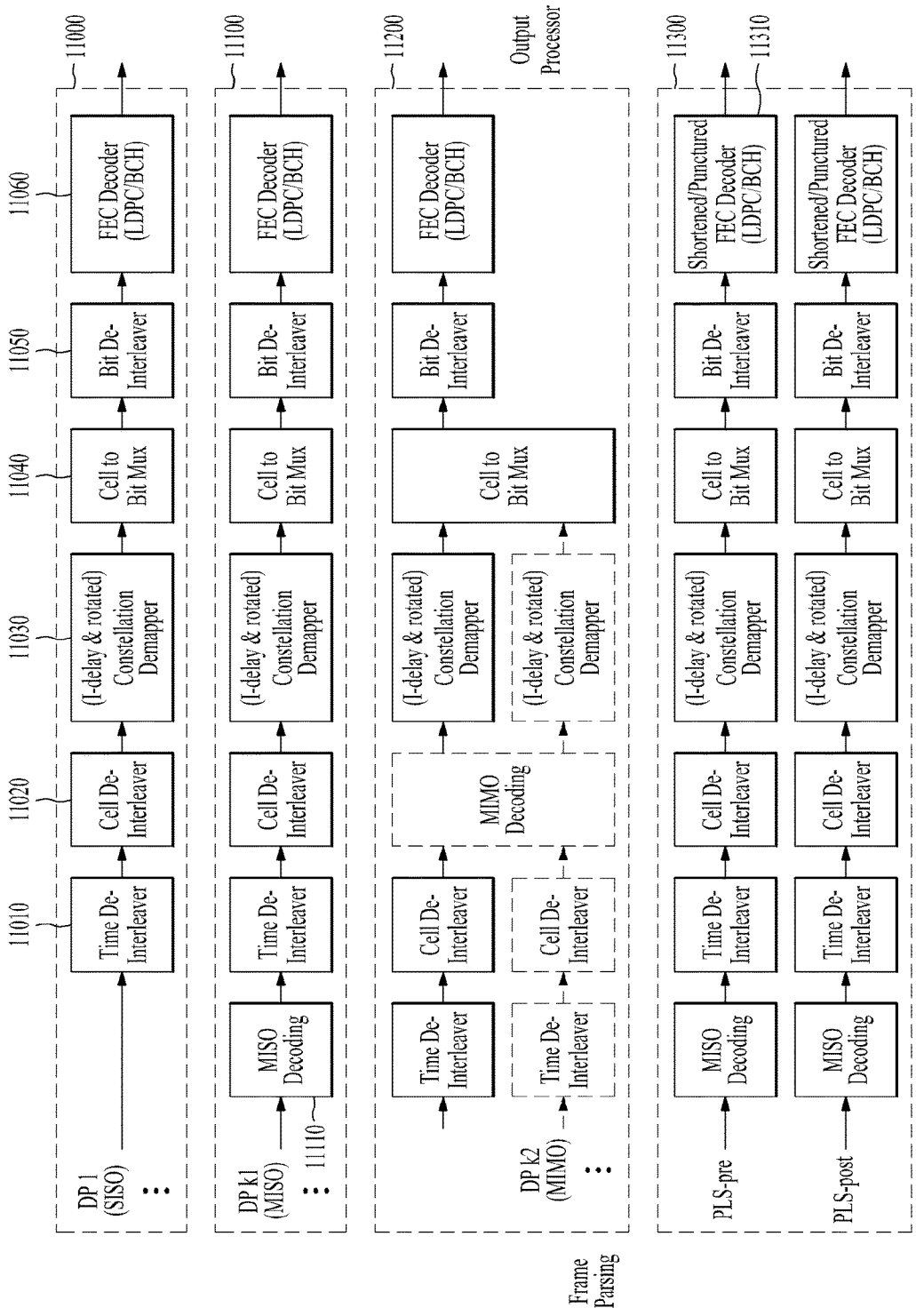
FIG. 11 illustrates a demapping & decoding module according to an embodiment of the present invention.

FIG. 11 illustrates a demapping & decoding module according to an embodiment of the present invention.

The demapping & decoding module shown in FIG. 11 corresponds to an embodiment of the demapping & decoding module illustrated in FIG. 8. The demapping & decoding module shown in FIG. 11 can perform a reverse operation of the operation of the coding & modulation module illustrated in FIG. 5.

The coding & modulation module of the apparatus for transmitting broadcast signals according to an embodiment of the present invention can process input data pipes by independently applying SISO, MISO and MIMO thereto for respective paths, as described above. Accordingly, the demapping & decoding module illustrated in FIG. 11 can include blocks for processing data output from the frame parsing module according to SISO, MISO and MIMO in response to the apparatus for transmitting broadcast signals.

As shown in FIG. 11, the demapping & decoding module according to an embodiment of the present invention can include a first block 11000 for SISO, a second block 11100 for MISO, a third block 11200 for MIMO and a fourth block 11300 for processing the PLS-pre/PLS-post information. The demapping & decoding module shown in FIG. 11 is exemplary and may include only the first block 11000 and the fourth block 11300, only the second block 11100 and the fourth block 11300 or only the third block 11200 and the fourth block 11300 according to design. That is, the demapping & decoding module can include blocks for processing data pipes equally or differently according to design.

A description will be given of each block of the demapping & decoding module.

The first block 11000 processes an input data pipe according to SISO and can include a time deinterleaver block 11010, a cell deinterleaver block 11020, a constellation demapper block 11030, a cell-to-bit mux block 11040, a bit deinterleaver block 11050 and an FEC decoder block 11060.

The time deinterleaver block 11010 can perform a reverse process of the process performed by the time interleaver block 5060 illustrated in FIG. 5. That is, the time deinterleaver block 11010 can deinterleave input symbols interleaved in the time domain into original positions thereof.

The cell deinterleaver block 11020 can perform a reverse process of the process performed by the cell interleaver block 5050 illustrated in FIG. 5. That is, the cell deinterleaver block 11020 can deinterleave positions of cells spread in one FEC block into original positions thereof.

The constellation demapper block 11030 can perform a reverse process of the process performed by the constellation mapper block 5040 illustrated in FIG. 5. That is, the constellation demapper block 11030 can demap a symbol domain input signal to bit domain data. In addition, the constellation demapper block 11030 may perform hard decision and output decided bit data. Furthermore, the constellation demapper block 11030 may output a log-likelihood ratio (LLR) of each bit, which corresponds to a soft decision value or probability value. If the apparatus for transmitting broadcast signals applies a rotated constellation in order to obtain additional diversity gain, the constellation demapper block 11030 can perform 2-dimensional LLR demapping corresponding to the rotated constellation. Here, the constellation demapper block 11030 can calculate the LLR such that a delay applied by the apparatus for transmitting broadcast signals to the I or Q component can be compensated.

The cell-to-bit mux block 11040 can perform a reverse process of the process performed by the bit-to-cell demux block 5030 illustrated in FIG. 5. That is, the cell-to-bit mux block 11040 can restore bit data mapped by the bit-to-cell demux block 5030 to the original bit streams.

The bit deinterleaver block 11050 can perform a reverse process of the process performed by the bit interleaver 5020 illustrated in FIG. 5. That is, the bit deinterleaver block 11050 can deinterleave the bit streams output from the cell-to-bit mux block 11040 in the original order.

The FEC decoder block 11060 can perform a reverse process of the process performed by the FEC encoder block 5010 illustrated in FIG. 5. That is, the FEC decoder block 11060 can correct an error generated on a transmission channel by performing LDPC decoding and BCH decoding.

The second block 11100 processes an input data pipe according to MISO and can include the time deinterleaver block, cell deinterleaver block, constellation demapper block, cell-to-bit mux block, bit deinterleaver block and FEC decoder block in the same manner as the first block 11000, as shown in FIG. 11. However, the second block 11100 is distinguished from the first block 11000 in that the second block 11100 further includes a MISO decoding block 11110. The second block 11100 performs the same procedure including time deinterleaving operation to outputting operation as the first block 11000 and thus description of the corresponding blocks is omitted.

The MISO decoding block 11110 can perform a reverse operation of the operation of the MISO processing block 5110 illustrated in FIG. 5. If the broadcast transmission/reception system according to an embodiment of the present invention uses STBC, the MISO decoding block 11110 can perform Alamouti decoding.

The third block 11200 processes an input data pipe according to MIMO and can include the time deinterleaver block, cell deinterleaver block, constellation demapper block, cell-to-bit mux block, bit deinterleaver block and FEC decoder block in the same manner as the second block 11100, as shown in FIG. 11. However, the third block 11200 is distinguished from the second block 11100 in that the third block 11200 further includes a MIMO decoding block 11210. The basic roles of the time deinterleaver block, cell deinterleaver block, constellation demapper block, cell-to-bit mux block and bit deinterleaver block included in the third block 11200 are identical to those of the corresponding blocks included in the first and second blocks 11000 and 11100 although functions thereof may be different from the first and second blocks 11000 and 11100.

The MIMO decoding block 11210 can receive output data of the cell deinterleaver for input signals of the m Rx antennas and perform MIMO decoding as a reverse operation of the operation of the MIMO processing block 5220 illustrated in FIG. 5. The MIMO decoding block 11210 can perform maximum likelihood decoding to obtain optimal decoding performance or carry out sphere decoding with reduced complexity. Otherwise, the MIMO decoding block 11210 can achieve improved decoding performance by performing MMSE detection or carrying out iterative decoding with MMSE detection.

The fourth block 11300 processes the PLS-pre/PLS-post information and can perform SISO or MISO decoding. The fourth block 11300 can carry out a reverse process of the process performed by the fourth block 5300 described with reference to FIG. 5.

The basic roles of the time deinterleaver block, cell deinterleaver block, constellation demapper block, cell-to-bit mux block and bit deinterleaver block included in the fourth block 11300 are identical to those of the corresponding blocks of the first, second and third blocks 11000, 11100 and 11200 although functions thereof may be different from the first, second and third blocks 11000, 11100 and 11200.

The shortened/punctured FEC decoder 11310 included in the fourth block 11300 can perform a reverse process of the process performed by the shortened/punctured FEC encoder block 5310 described with reference to FIG. 5. That is, the shortened/punctured FEC decoder 11310 can perform de-shortening and de-puncturing on data shortened/punctured according to PLS data length and then carry out FEC decoding thereon. In this case, the FEC decoder used for data pipes can also be used for PLS. Accordingly, additional FEC decoder hardware for the PLS only is not needed and thus system design is simplified and efficient coding is achieved.

The above-described blocks may be omitted or replaced by blocks having similar or identical functions according to design.

The demapping & decoding module according to an embodiment of the present invention can output data pipes and PLS information processed for the respective paths to the output processor, as illustrated in FIG. 11.

Figure 12:
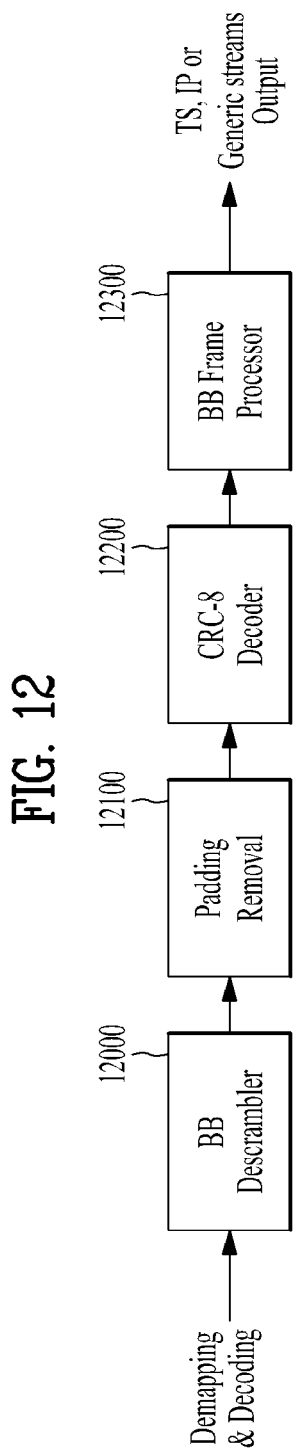
FIG. 12 illustrates an output processor according to an embodiment of the present invention.
Figure 13:
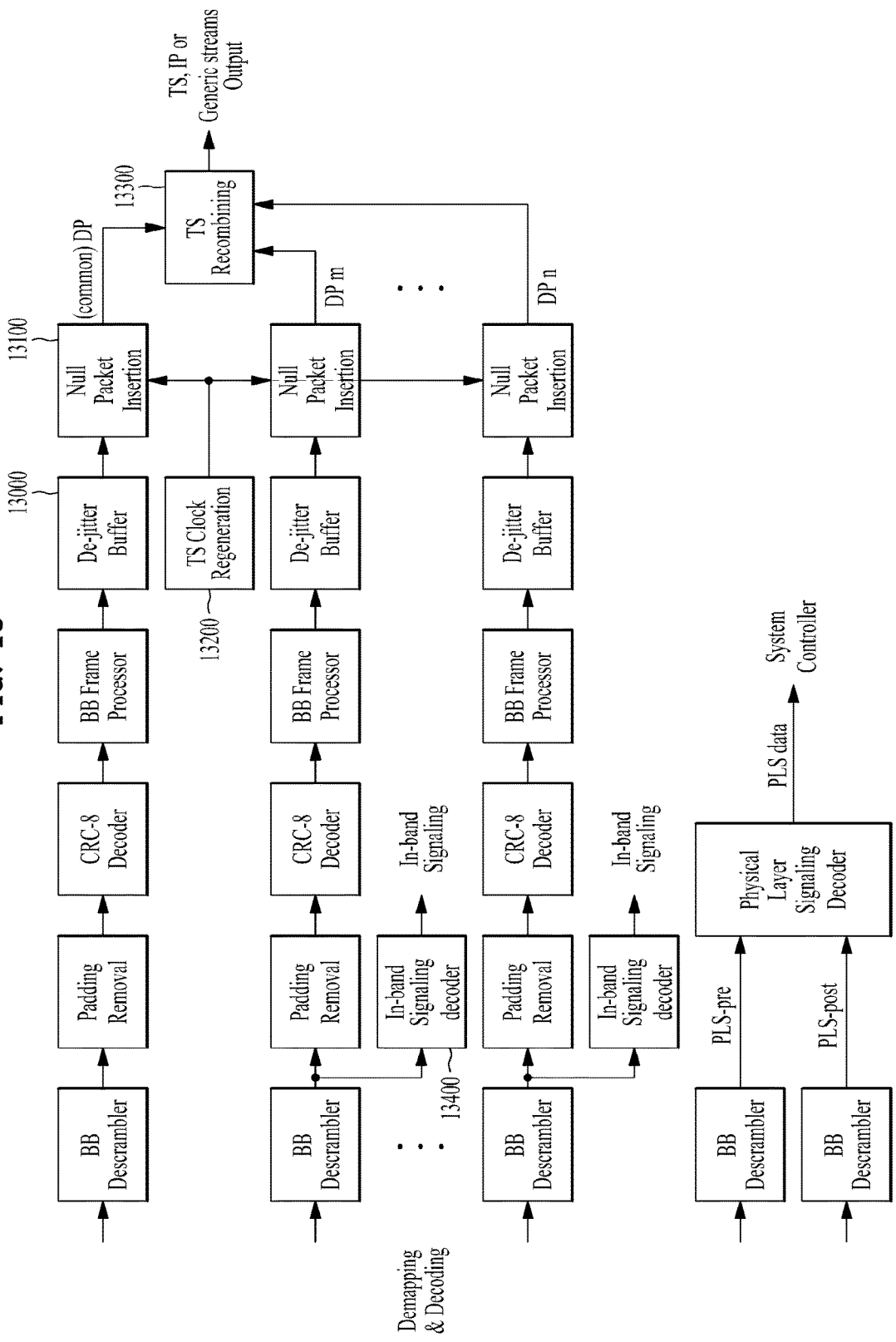
FIG. 13 illustrates an output processor according to another embodiment of the present invention.

FIGS. 12 and 13 illustrate output processors according to embodiments of the present invention.

FIG. 12 illustrates an output processor according to an embodiment of the present invention. The output processor illustrated in FIG. 12 corresponds to an embodiment of the output processor illustrated in FIG. 8. The output processor illustrated in FIG. 12 receives a single data pipe output from the demapping & decoding module and outputs a single output stream. The output processor can perform a reverse operation of the operation of the input formatting module illustrated in FIG. 2.

The output processor shown in FIG. 12 can include a BB scrambler block 12000, a padding removal block 12100, a CRC-8 decoder block 12200 and a BB frame processor block 12300.

The BB scrambler block 12000 can descramble an input bit stream by generating the same PRBS as that used in the apparatus for transmitting broadcast signals for the input bit stream and carrying out an XOR operation on the PRBS and the bit stream.

The padding removal block 12100 can remove padding bits inserted by the apparatus for transmitting broadcast signals as necessary.

The CRC-8 decoder block 12200 can check a block error by performing CRC decoding on the bit stream received from the padding removal block 12100.

The BB frame processor block 12300 can decode information transmitted through a BB frame header and restore MPEG-TSs, IP streams (v4 or v6) or generic streams using the decoded information.

The above-described blocks may be omitted or replaced by blocks having similar or identical functions according to design.

FIG. 13 illustrates an output processor according to another embodiment of the present invention. The output processor shown in FIG. 13 corresponds to an embodiment of the output processor illustrated in FIG. 8. The output processor shown in FIG. 13 receives multiple data pipes output from the demapping & decoding module. Decoding multiple data pipes can include a process of merging common data commonly applicable to a plurality of data pipes and data pipes related thereto and decoding the same or a process of simultaneously decoding a plurality of services or service components (including a scalable video service) by the apparatus for receiving broadcast signals.

The output processor shown in FIG. 13 can include a BB descrambler block, a padding removal block, a CRC-8 decoder block and a BB frame processor block as the output processor illustrated in FIG. 12. The basic roles of these blocks correspond to those of the blocks described with reference to FIG. 12 although operations thereof may differ from those of the blocks illustrated in FIG. 12.

A de-jitter buffer block 13000 included in the output processor shown in FIG. 13 can compensate for a delay, inserted by the apparatus for transmitting broadcast signals for synchronization of multiple data pipes, according to a restored TTO (time to output) parameter.

A null packet insertion block 13100 can restore a null packet removed from a stream with reference to a restored DNP (deleted null packet) and output common data.

A TS clock regeneration block 13200 can restore time synchronization of output packets based on ISCR (input stream time reference) information.

A TS recombining block 13300 can recombine the common data and data pipes related thereto, output from the null packet insertion block 13100, to restore the original MPEG-TSs, IP streams (v4 or v6) or generic streams. The TTO, DNT and ISCR information can be obtained through the BB frame header.

An in-band signaling decoding block 13400 can decode and output in-band physical layer signaling information transmitted through a padding bit field in each FEC frame of a data pipe.

The output processor shown in FIG. 13 can BB-descramble the PLS-pre information and PLS-post information respectively input through a PLS-pre path and a PLS-post path and decode the descrambled data to restore the original PLS data. The restored PLS data is delivered to a system controller included in the apparatus for receiving broadcast signals. The system controller can provide parameters necessary for the synchronization & demodulation module, frame parsing module, demapping & decoding module and output processor module of the apparatus for receiving broadcast signals.

The above-described blocks may be omitted or replaced by blocks having similar r identical functions according to design.

Figure 14:
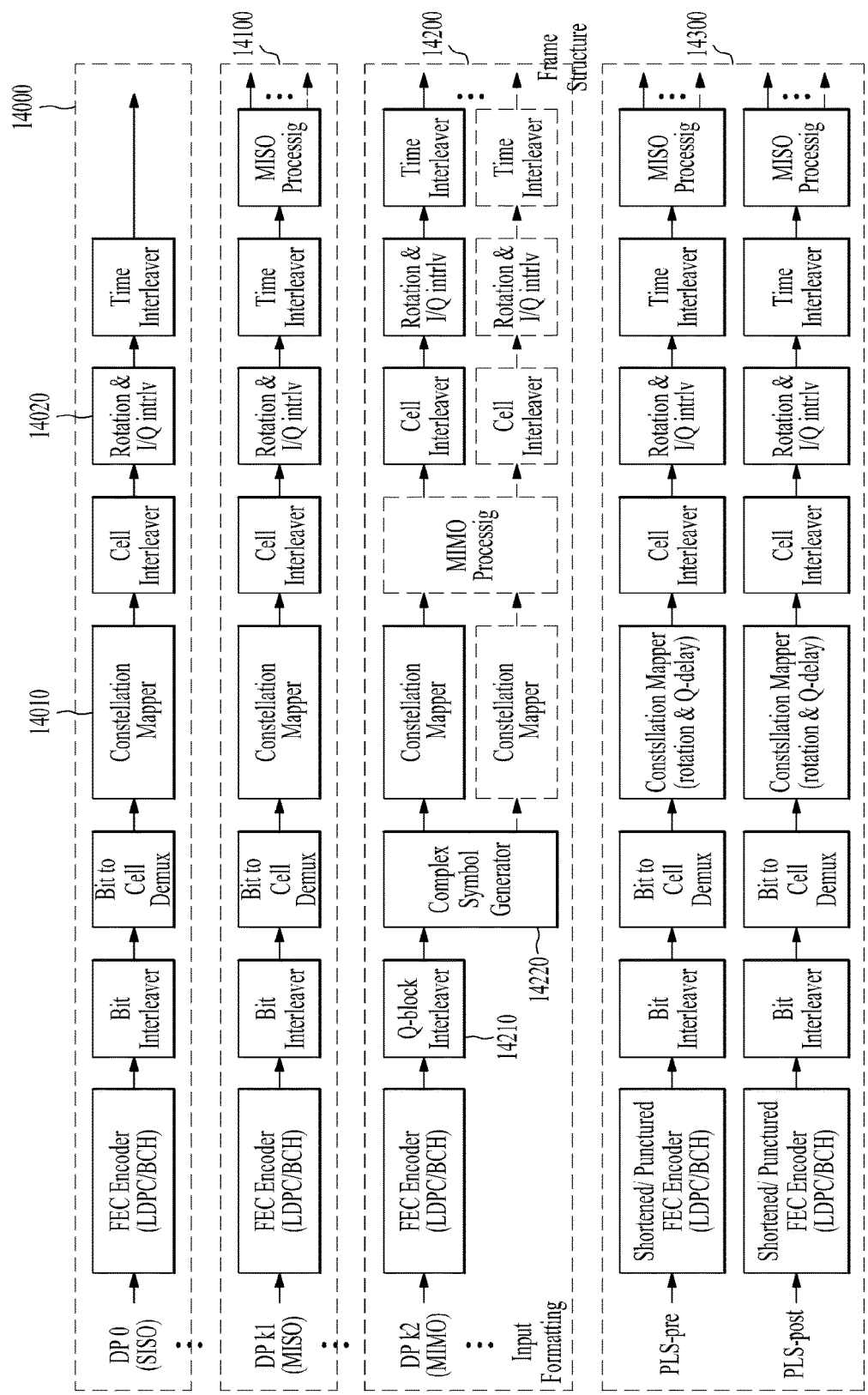
FIG. 14 illustrates a coding & modulation module according to another embodiment of the present invention.

FIG. 14 illustrates a coding & modulation module according to another embodiment of the present invention.

The coding & modulation module shown in FIG. 14 corresponds to another embodiment of the coding & modulation module illustrated in FIGS. 1 to 5.

To control QoS for each service or service component transmitted through each data pipe, as described above with reference to FIG. 5, the coding & modulation module shown in FIG. 14 can include a first block 14000 for SISO, a second block 14100 for MISO, a third block 14200 for MIMO and a fourth block 14300 for processing the PLS-pre/PLS-post information. In addition, the coding & modulation module can include blocks for processing data pipes equally or differently according to the design. The first to fourth blocks 14000 to 14300 shown in FIG. 14 are similar to the first to fourth blocks 5000 to 5300 illustrated in FIG. 5.

However, the first to fourth blocks 14000 to 14300 shown in FIG. 14 are distinguished from the first to fourth blocks 5000 to 5300 illustrated in FIG. 5 in that a constellation mapper 14010 included in the first to fourth blocks 14000 to 14300 has a function different from the first to fourth blocks 5000 to 5300 illustrated in FIG. 5, a rotation & I/Q interleaver block 14020 is present between the cell interleaver and the time interleaver of the first to fourth blocks 14000 to 14300 illustrated in FIG. 14 and the third block 14200 for MIMO has a configuration different from the third block 5200 for MIMO illustrated in FIG. 5. The following description focuses on these differences between the first to fourth blocks 14000 to 14300 shown in FIG. 14 and the first to fourth blocks 5000 to 5300 illustrated in FIG. 5.

The constellation mapper block 14010 shown in FIG. 14 can map an input bit word to a complex symbol. However, the constellation mapper block 14010 may not perform constellation rotation, differently from the constellation mapper block shown in FIG. 5. The constellation mapper block 14010 shown in FIG. 14 is commonly applicable to the first, second and third blocks 14000, 14100 and 14200, as described above.

The rotation & I/Q interleaver block 14020 can independently interleave in-phase and quadrature-phase components of each complex symbol of cell-interleaved data output from the cell interleaver and output the in-phase and quadrature-phase components on a symbol-by-symbol basis. The number of number of input data pieces and output data pieces of the rotation & I/Q interleaver block 14020 is two or more which can be changed by the designer. In addition, the rotation & I/Q interleaver block 14020 may not interleave the in-phase component.

The rotation & I/Q interleaver block 14020 is commonly applicable to the first to fourth blocks 14000 to 14300, as described above. In this case, whether or not the rotation & I/Q interleaver block 14020 is applied to the fourth block 14300 for processing the PLS-pre/post information can be signaled through the above-described preamble.

The third block 14200 for MIMO can include a Q-block interleaver block 14210 and a complex symbol generator block 14220, as illustrated in FIG. 14.

The Q-block interleaver block 14210 can permute a parity part of an FEC-encoded FEC block received from the FEC encoder. Accordingly, a parity part of an LDPC H matrix can be made into a cyclic structure like an information part. The Q-block interleaver block 14210 can permute the order of output bit blocks having Q size of the LDPC H matrix and then perform row-column block interleaving to generate final bit streams.

The complex symbol generator block 14220 receives the bit streams output from the Q-block interleaver block 14210, maps the bit streams to complex symbols and outputs the complex symbols. In this case, the complex symbol generator block 14220 can output the complex symbols through at least two paths. This can be modified by the designer.

The above-described blocks may be omitted or replaced by blocks having similar or identical functions according to design.

The coding & modulation module according to another embodiment of the present invention, illustrated in FIG. 14, can output data pipes, PLS-pre information and PLS-post information processed for respective paths to the frame structure module.

Figure 15:
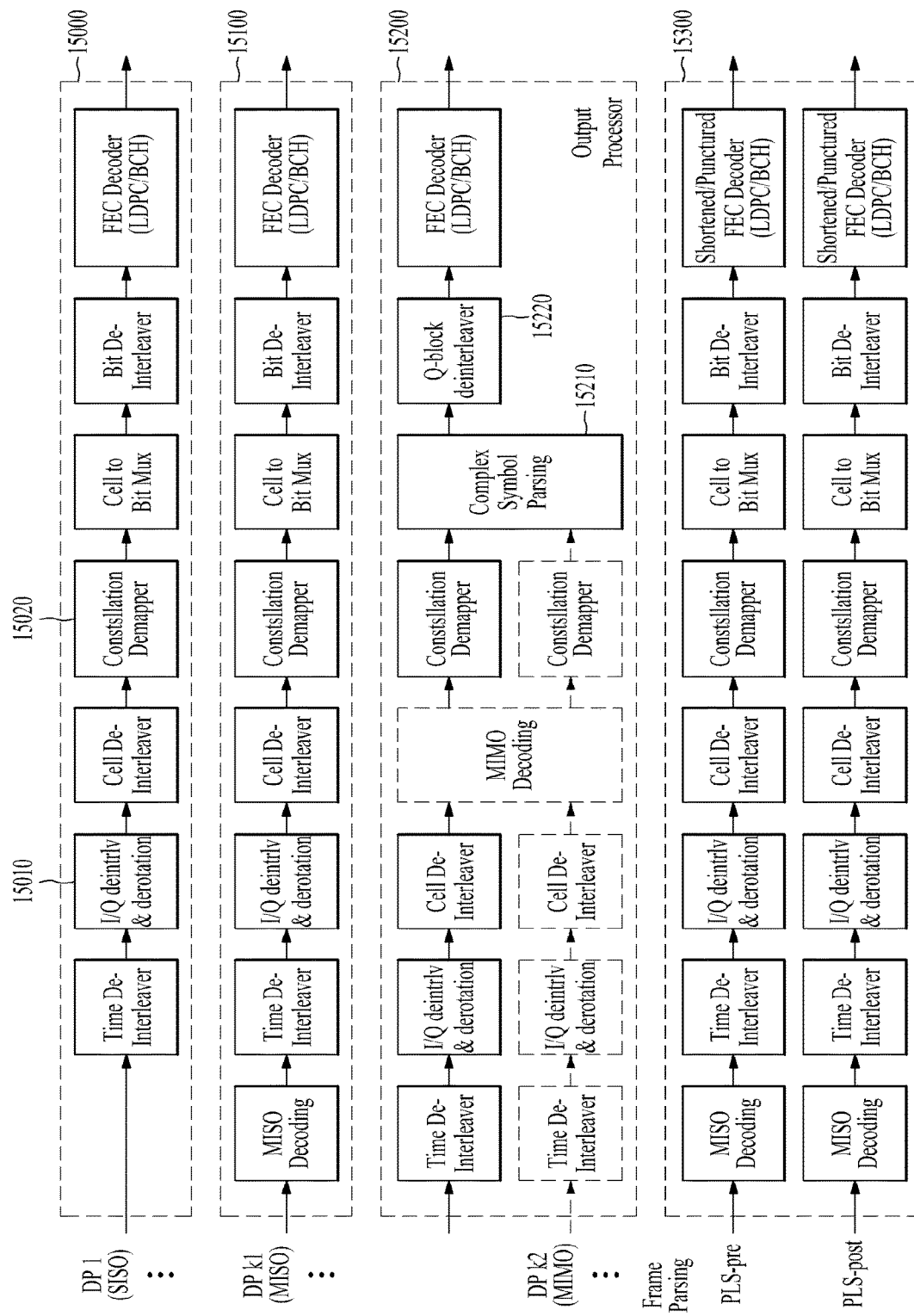
FIG. 15 illustrates a demapping & decoding module according to another embodiment of the present invention.

FIG. 15 illustrates a demapping & decoding module according to another embodiment of the present invention.

The demapping & decoding module shown in FIG. 15 corresponds to another embodiment of the demapping & decoding module illustrated in FIG. 11. The demapping & decoding module shown in FIG. 15 can perform a reverse operation of the operation of the coding & modulation module illustrated in FIG. 14.

As shown in FIG. 15, the demapping & decoding module according to another embodiment of the present invention can include a first block 15000 for SISO, a second block 11100 for MISO, a third block 15200 for MIMO and a fourth block 14300 for processing the PLS-pre/PLS-post information. In addition, the demapping & decoding module can include blocks for processing data pipes equally or differently according to design. The first to fourth blocks 15000 to 15300 shown in FIG. 15 are similar to the first to fourth blocks 11000 to 11300 illustrated in FIG. 11.

However, the first to fourth blocks 15000 to 15300 shown in FIG. 15 are distinguished from the first to fourth blocks 11000 to 11300 illustrated in FIG. 11 in that an I/Q deinterleaver and derotation block 15010 is present between the time interleaver and the cell deinterleaver of the first to fourth blocks 15000 to 15300, a constellation mapper 15010 included in the first to fourth blocks 15000 to 15300 has a function different from the first to fourth blocks 11000 to 11300 illustrated in FIG. 11 and the third block 15200 for MIMO has a configuration different from the third block 11200 for MIMO illustrated in FIG. 11. The following description focuses on these differences between the first to fourth blocks 15000 to 15300 shown in FIG. 15 and the first to fourth blocks 11000 to 11300 illustrated in FIG. 11.

The I/Q deinterleaver & derotation block 15010 can perform a reverse process of the process performed by the rotation & I/Q interleaver block 14020 illustrated in FIG. 14. That is, the I/Q deinterleaver & derotation block 15010 can deinterleave I and Q components I/Q-interleaved and transmitted by the apparatus for transmitting broadcast signals and derotate complex symbols having the restored I and Q components.

The I/Q deinterleaver & derotation block 15010 is commonly applicable to the first to fourth blocks 15000 to 15300, as described above. In this case, whether or not the I/Q deinterleaver & derotation block 15010 is applied to the fourth block 15300 for processing the PLS-pre/post information can be signaled through the above-described preamble.

The constellation demapper block 15020 can perform a reverse process of the process performed by the constellation mapper block 14010 illustrated in FIG. 14. That is, the constellation demapper block 15020 can demap cell-deinterleaved data without performing derotation.

The third block 15200 for MIMO can include a complex symbol parsing block 15210 and a Q-block deinterleaver block 15220, as shown in FIG. 15.

The complex symbol parsing block 15210 can perform a reverse process of the process performed by the complex symbol generator block 14220 illustrated in FIG. 14. That is, the complex symbol parsing block 15210 can parse complex data symbols and demap the same to bit data. In this case, the complex symbol parsing block 15210 can receive complex data symbols through at least two paths.

The Q-block deinterleaver block 15220 can perform a reverse process of the process carried out by the Q-block interleaver block 14210 illustrated in FIG. 14. That is, the Q-block deinterleaver block 15220 can restore Q size blocks according to row-column deinterleaving, restore the order of permuted blocks to the original order and then restore positions of parity bits to original positions according to parity deinterleaving.

The above-described blocks may be omitted or replaced by blocks having similar or identical functions according to design.

As illustrated in FIG. 15, the demapping & decoding module according to another embodiment of the present invention can output data pipes and PLS information processed for respective paths to the output processor.

As described above, the apparatus and method for transmitting broadcast signals according to an embodiment of the present invention can multiplex signals of different broadcast transmission/reception systems within the same RF channel and transmit the multiplexed signals and the apparatus and method for receiving broadcast signals according to an embodiment of the present invention can process the signals in response to the broadcast signal transmission operation. Accordingly, it is possible to provide a flexible broadcast transmission and reception system.

As described above, the waveform generation module 1300 according to an embodiment of the present invention may convert signal frames output from the frame structure module 1200 into ultimately transmittable signals. In this case, the waveform generation module 1300 according to an embodiment of the present invention may use a phase pre-distortion (PPD) method (or phase distortion). The phase pre-distortion method according to an embodiment of the present invention may be also referred to as a distributed MISO scheme or 2D-eSFN. In addition, the present invention assumes that input signals of the waveform generation block 1300 are the same.

The system according to the present invention supports the SFN (Single Frequency Network) network, where distributed MISO scheme is optionally used to support very robust transmission mode. The 2D-eSFN is a distributed MISO scheme that uses multiple TX antennas, each of which is located in the different transmitter site in the SFN network.

In the SFN configuration, the 2D-eSFN processing independently distorts the phase of the signals transmitted from multiple transmitters, in order to create both time and frequency diversity. Hence, burst errors due to low flat fading or deep-fading for a long time can be mitigated.

According to the phase pre-distortion method of the present invention, the performance of channel estimation by a broadcast signal reception apparatus may not deteriorate and gain distortion of a transmission signal may not be caused and thus the loss of transmission capacity due to the gain distortion may be minimized.

In addition, the phase pre-distortion method of the present invention may be applied independently to a plurality of TX antennas as described above and thus a diversity gain may be achieved. Further, since the broadcast signal reception apparatus does not need to process phase pre-distortion, additional complexity is not required to design the broadcast signal reception apparatus.

Figure 16:
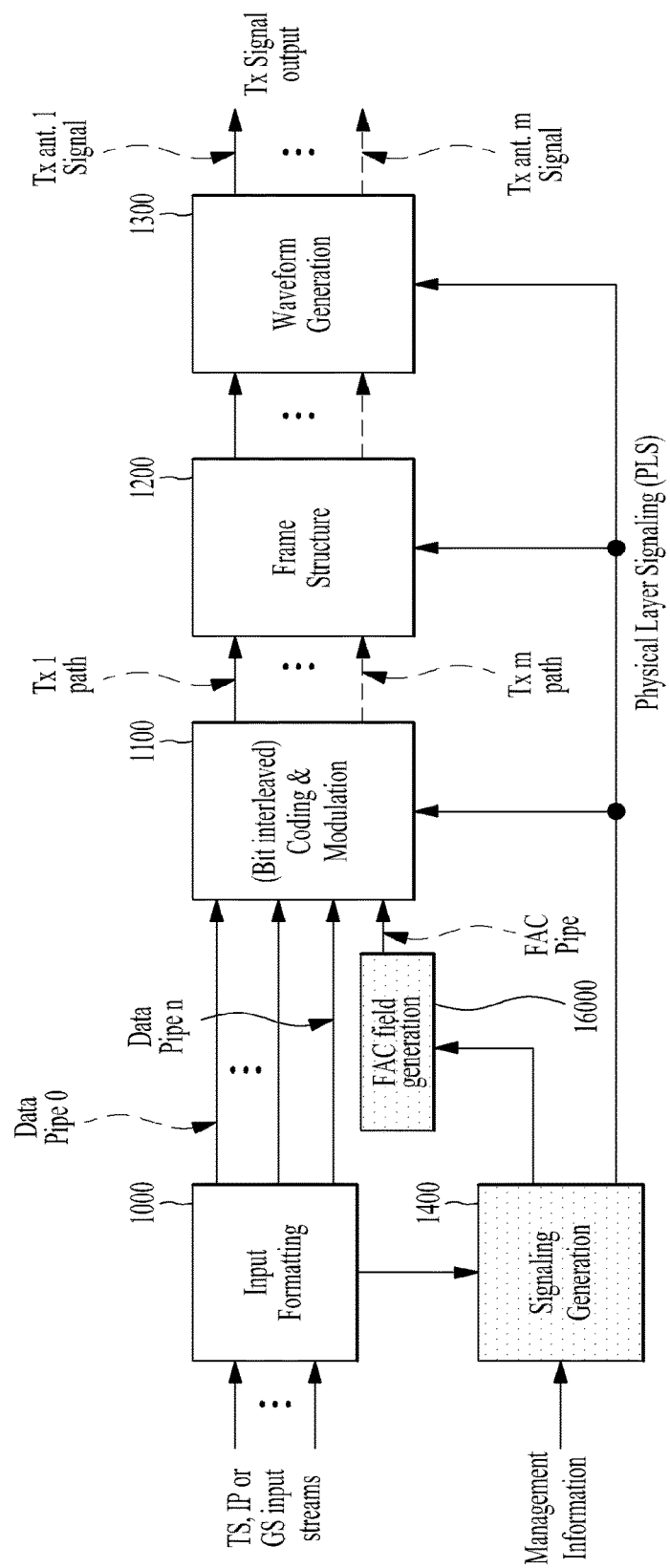
FIG. 16 is a diagram illustrating a broadcast signal transmitter according to one embodiment of the present invention.

FIG. 16 is a diagram illustrating a broadcast signal transmitter according to one embodiment of the present invention.

Before description is given of FIG. 16, details of the FAC field generated by a FAC field generation module 16000 will be described.

FAC (Fast Acquisition Channel) is data containing information allowing a broadcast signal receiver to quickly acquire information about services contained in a broadcast signal received over a radio frequency (RF) channel or information enabling fast scan of multiple RF channels. Hereinafter, the FAC will be called a fast information channel (FIC) in this specification.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services. The FIC data is generated and consumed in the Management Layer.

A broadcast signal transmitter according to one embodiment of the present invention may allocate the FAC in a signal frame separately from (independently of) a data region for transmission of services. The main object of the FAC is to efficiently transmit essential information for fast acquisition of broadcasting services. The FAC may include information about services that a current signal frame includes. The FAC may carry the number and types of services included in a frame that the broadcast signal receiver receives over an RF channel, and information about DPs which correspond to the respective services and enable decoding of the services. Details of a FAC field containing the information about the services will be described later.

The broadcast signal transmitter according to one embodiment of the present invention may include an input formatting module 1000, a coding & modulation module 1100, a frame structure module 1200, a waveform generation module 1300, a signaling generation module 1400, and a FAC field generation module 16000. The input formatting module 1000, coding & modulation) module 1100, frame structure module 1200, waveform generation module 1300 and signaling generation module 1400 may operate in same manner as described above.

The FAC field generation module 16000 of the broadcast signal transmitter may generate a FAC field. In addition, the broadcast signal transmitter may transmit the FAC field by mapping the FAC field onto a signal frame. While the FAC field generation module 16000 and the signaling generation module 1400 are separately shown in FIG. 16, the signaling generation module 1400 may perform the operation of the FAC field generation module 16000, or in some cases, the signaling generation module 1400 may include the FAC field generation module 16000.

The FAC may be omitted depending on the intention of the designer, and the preamble or PLS may contain information indicating whether or not the FAC is present.

The illustrated blocks may be omitted or replaced with other blocks having functions similar to or the same as the functions of the illustrated blocks, depending on the intention of the designer.

As described above, a signal frame according to one embodiment of the present invention may include a preamble symbol, PLS data and DP data. One signal frame may include a plurality of OFDM symbols, which may be classified as follows to transmit the PLS data and DP data described above.

The preamble symbol, which is a fixed-length pilot symbol that may carry preamble data (which may be called basic PLS data), is located in the beginning of a frame.

The signaling symbol (or frame signaling symbol (FSS)) is an OFDM symbol with higher pilot density used at the start of a frame which carries a part of the PLS data. In terms of size, the signaling symbol may have a variable length. The signal frame according to the illustrated embodiment may include at least one signaling symbol, which may be positioned behind the preamble symbol described above.

The preamble symbol may be used as a concept including a signaling symbol. In addition, according to this embodiment, a region including the preamble symbol and the at least one signaling symbol in the signal frame may be called a preamble or preamble symbol region. Or the region having the preamble symbol alone may be called a preamble. The definition of the region may be changed depending on the intention of the designer.

The data symbol is used in DP data mapping. The signal frame of the illustrated embodiment may include a plurality of data symbols, which may be positioned behind the signaling symbol described above. In the present invention, a region including data symbols in a signal frame may be called a data symbol region.

According to one embodiment of the present invention, the FAC data may be mapped onto the signaling symbol only, or may be continuously mapped onto a data symbol positioned behind the signaling symbol. The position of the FAC data in a signal frame will be described later.

As described above with reference to FIG. 8, the broadcast signal receiver according to one embodiment can include a synchronization & demodulation module 8000, a frame parsing module 8100, a demapping & decoding module 8200, an output processor 8300 and a signaling decoding module 8400. Each module operates as described above. The signaling decoding module 8400 may perform FAC data decoding. Alternatively, the signaling decoding module 8400 may include a FAC data decoding module, which is not illustrated in FIG. 16. Alternatively, the demapping & decoding module 8200 may include a FAC data decoding module, which is not illustrated in FIG. 16. The FAC data decoding module may be positioned independently of the signaling decoding module 8400 or the demapping & decoding module 8200.

The FAC decoding scheme for the broadcast signal receiver of the illustrated embodiment may change depending on the method (or position) in which the FAC is inserted in a signal frame.

Specifically, the broadcast signal receiver of this embodiment may perform PLS data decoding and FAC data decoding independently. That is, the broadcast signal receiver may detect a preamble and then decode FAC data. The broadcast signal transmitter may insert the FAC between PLS-pre and PLS-post to allow the broadcast signal receiver to perform the PLS data decoding and the FAC data decoding independently.

Alternatively, the broadcast signal receiver perform the PLS data decoding and then perform the FAC data decoding. That is, the broadcast signal receiver may decode PLS data and then FAC data after detecting the preamble. The broadcast signal transmitter may insert the FAC after the PLS.

Figure 17:
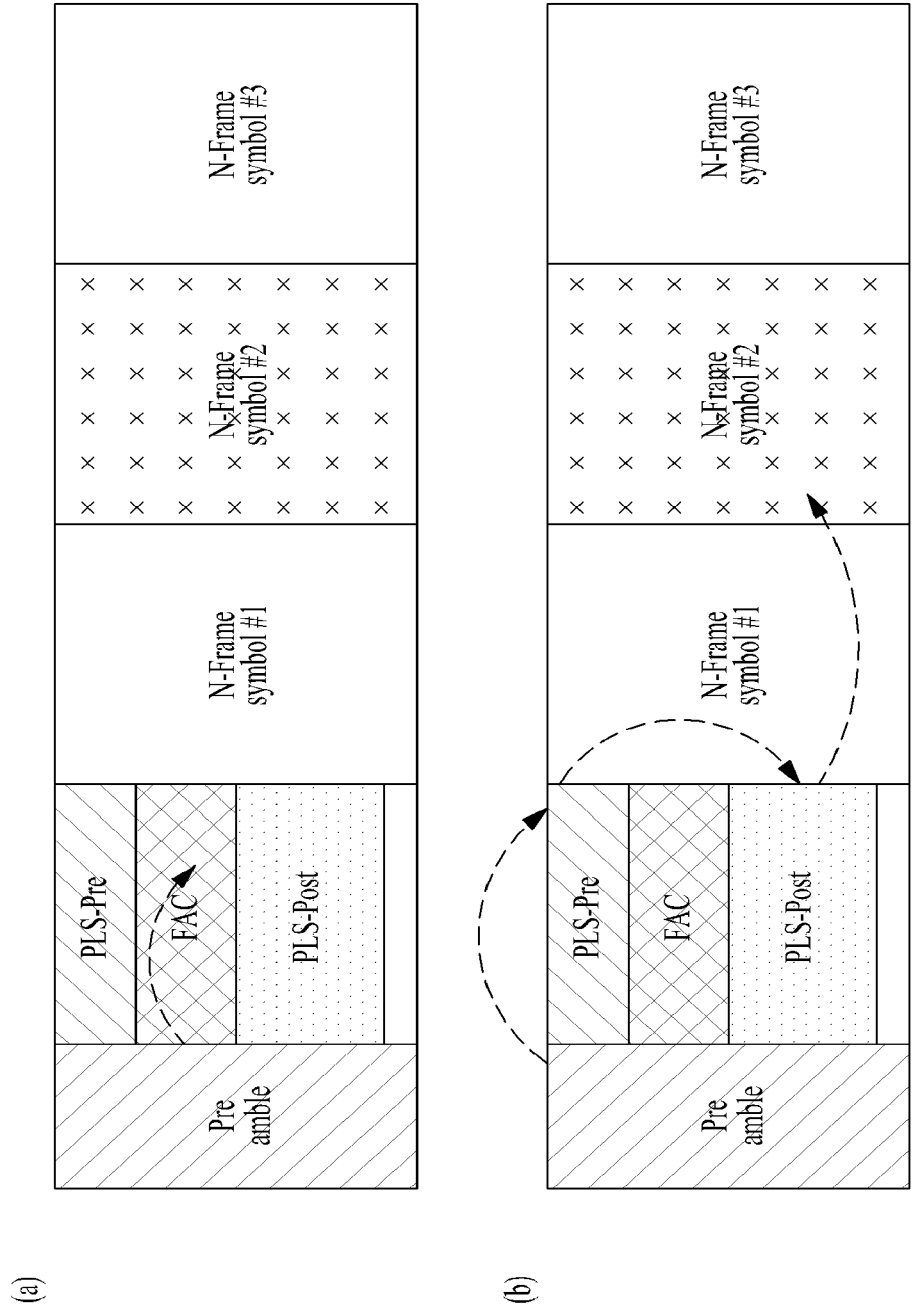
FIG. 17 illustrates operation of a broadcast signal receiver according to one embodiment of the present invention.

FIG. 17 illustrates operation of a broadcast signal receiver according to one embodiment of the present invention.

FIG. 17 illustrates operation of the broadcast signal receiver according to one embodiment which performs the FAC data decoding without performing the PLS decoding in the case in which the broadcast signal receiver receives a signal frame including a FAC. A broadcast signal transmitter according to one embodiment may build a signal frame including the FAC having a fixed size. In this case, the broadcast signal transmitter may insert (or map) the FAC between PLS-pre information and PLS-post information to build a signal frame.

According to this embodiment, the signal frame may be continuously transmitted over one RF channel in the time axis, and FIG. 17 shows a signal frame transmitted for the N-th time (indicated by N-Frame). As described above, the preamble may be positioned at the foremost end of a signal frame, and the PLS-pre information, FAC, and PLS-post information may be subsequently mapped. Thereafter, data symbol #1 (indicated by symbol #1 in FIG. 17), data symbol #2 (indicated by symbol #2 in FIG. 17), and data symbol #3 (indicated by symbol #3 in FIG. 17) may be sequentially mapped.

FIG. 17(a) is a diagram illustrating a process in which a broadcast signal receiver according to one embodiment decodes the FAC data included in a signal frame.

FIG. 17(b) is a diagram illustrating a process in which the broadcast signal receiver according to one embodiment decodes the DP data included in the signal frame.

The arrows shown in the figures represent a sequence of specific operations of the broadcast signal receiver performed in the signal frame to acquire the FAC or DP data.

Referring to FIG. 17(a), according to this embodiment, the PLS-pre information included in the signal frame may have a fixed size. The broadcast signal receiver may detect a preamble, thereby acquiring information for decoding the PLS-pre information. That is, according to this embodiment, the preamble may include information indicating the length of the PLS-pre information, a type of modulation (MOD) applied to the PLS-pre information, and a type of code rate (COD) applied to the PLS-pre information. Accordingly, the broadcast signal receiver may detect the preamble, thereby acquiring the length of the PLS-pre information and directly detecting the position of the FAC mapped after the PLS-pre information. That is, the broadcast signal receiver may directly decode the FAC data without decoding the PLS-pre information.

Referring to FIG. 17(b), the broadcast signal receiver of this embodiment may decode the preamble and then acquire information about the PLS-pre. Thereafter, the broadcast signal receiver may decode the PLS-pre information based on the acquired information about the PLS-pre, thereby acquiring the information about the PLS-post. The PLS-pre information may include information indicating the length of the PLS-post information, the type of modulation (MOD) applied to the PLS-post information, and the type of code rate (COD) applied to the PLS-post information and PLS-offset information indicating the length of the FAC. According to this embodiment, the PLS-offset may be set to '0' if the signal frame does not include the FAC. The PLS-post information may have a variable size. Accordingly, the broadcast signal receiver may confirm the length of the FAC using the PLS-offset information included in the PLS-pre, and then immediately decode the PLS-post information without decoding the FAC. Thereafter, the broadcast signal receiver may decode the PLS-post information to acquire information about a DP since the PLS-post includes information about a DP as described above. That is, as shown in FIG. 17(b), the broadcast signal receiver may decode the DP data mapped onto symbol #2 of the N-th frame based on the acquired information about the DP, thereby acquiring a service corresponding to the DP data.

According to one embodiment of the present invention, the PLS-pre information and the PLS-post information may be mapped only onto the preamble symbol or the signaling symbol. However, in the case in which the FAC is positioned between the PLS-pre information and the PLS-post information as shown in FIGS. 17 and 18, the FAC may be mapped onto the preamble symbol or the signaling symbol.

As described above, since the PLS-post information has a variable size, the overall size of the PLS data is variable. Accordingly, in one embodiment of the present invention, the FAC is restricted to a fixed size to efficiently map the PLS data to the signaling symbol. In this case, the size of the FAC is restricted, but fast acquisition of the FAC may be enabled by the preamble decoding alone as the FAC is mapped to the signaling symbol.

The FAC having the fixed size is simply illustrative, and embodiments of the present invention are not limited thereto.

Figure 18:
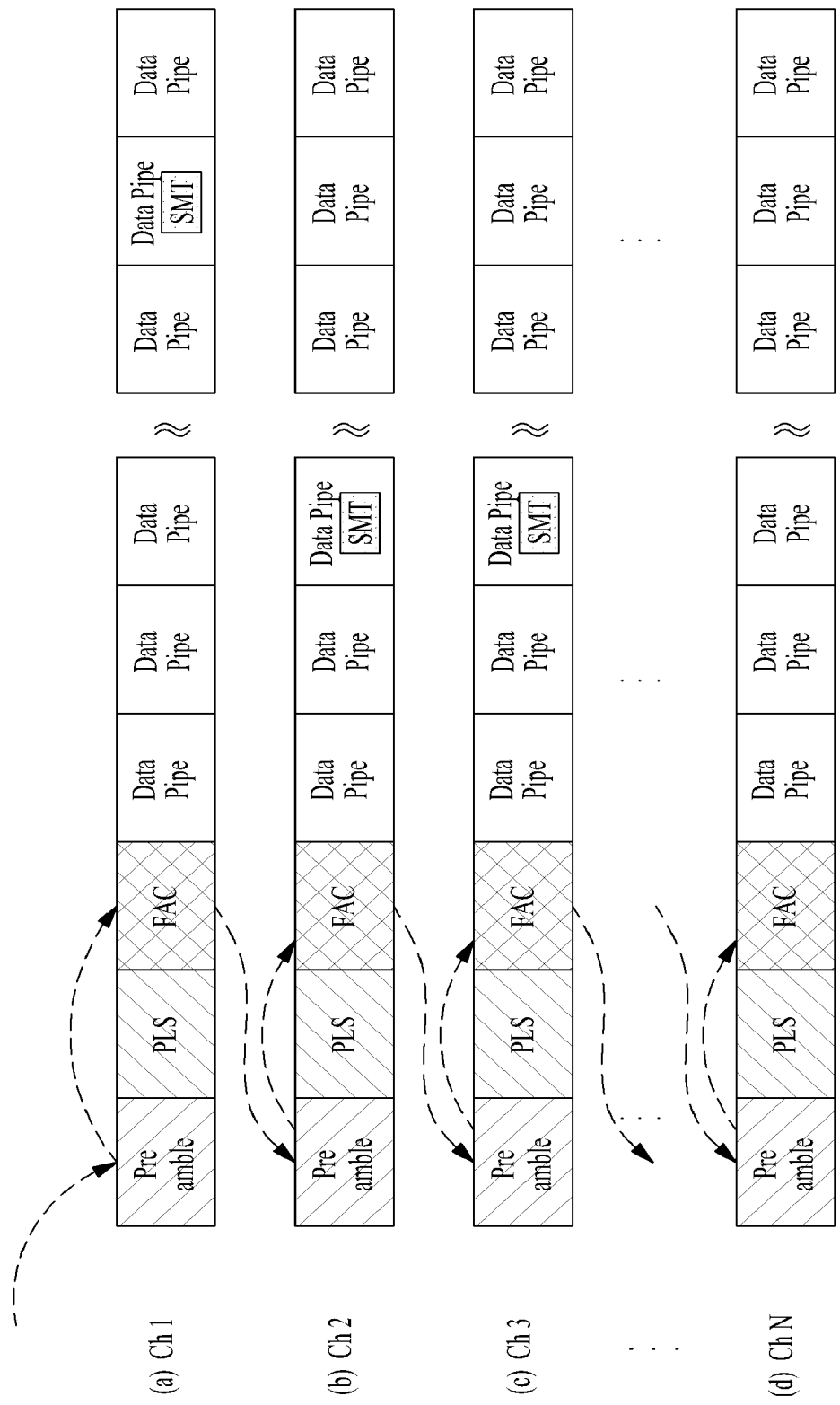
FIG. 18 illustrates a channel scanning operation of a broadcast signal receiver of one embodiment of the present invention which decodes the FAC data without decoding the PLS data when the broadcast signal receiver receives a signal frame including the FAC.

FIG. 18 illustrates a channel scanning operation of a broadcast signal receiver of one embodiment of the present invention which decodes the FAC data without decoding the PLS data when the broadcast signal receiver receives a signal frame including the FAC.

According to this embodiment, the broadcast signal receiver may perform the PLS data decoding and the FAC data decoding independently. A broadcast signal transmitter according to one embodiment of the present invention may insert the FAC between the PLS-pre and the PLS-post to allow the broadcast signal receiver to perform the PLS data decoding and the FAC data decoding independently.

The structure of a signal frame received over each channel is the same as that of the signal frame described above. DPs (indicated by Data Pipes in FIG. 18) mapped to a signal frame may represent DP data transmitted through each DP. The DP data transmitted through each DP may correspond to N-frame symbols #1, #2 and #3 described above. In this case, some DPs included in the data symbol region described above may transmit a service map table (SMT).

The SMT is a table including information indicating attributes of services mapped to a signal frame for a corresponding DP or service components. Accordingly, while the FAC includes information about services configuring a signal frame, the SMT may include fields such as service status, service protection indicator (SP_indicator), service category, essential_component_indicator indicating whether a component is an essential component, information for identifying a DP (DP_ID), which are information indicating attributes of the services.

According to one embodiment, the SMT may be transmitted through the preamble signaling region described above. In addition, the SMT may be transmitted through a specific DP. The specific DP may be the DP of a DP group (or DP cluster) which shall always be decoded in order for the receiver to play-out the service partially or fully, i.e. with part or all of the service components respectively. In this case, the specific DP may also transmit a network information table (NIT) as well as the SMT. The NIT according to an embodiment of the present invention may convey information relating to the physical organization of the multiplexes/TSs carried via a given network, and the characteristics of the network itself. The structure of a signal frame for transmitting the SMT and the NIT may be changed depending on the intention of the designer, rather than being limited to the illustrated embodiment.

In FIG. 18, for simplicity of illustration, the FAC included in the signal frame is mapped after the PLS-pre and the PLS-post, unlike the FAC described above, which has a fixed size in a signal frame and is mapped between the PLS-pre and the PLS-post. It should be noted that the illustrated signal frame including the FAC having a fixed size is for operation of the broadcast signal receiver.

The arrows shown in FIG. 18 represent a sequence of the overall channel scanning operation of the broadcast signal receiver.

Referring to FIG. 18(a), to implement fast channel scan, the broadcast signal receiver may decode the FAC immediately after decoding the preamble on channel 1 (indicated by Ch 1 in FIG. 18(a)). Thereby, the broadcast signal receiver may acquire information about the services configuring channel 1.

Thereafter, as shown in FIG. 18(b), the broadcast signal receiver may decode the FAC immediately after decoding the preamble on channel 2 (indicated by Ch 2 in FIG. 18(b)). Thereby, the broadcast signal receiver may acquire information about the services configuring channel 2.

Thereafter, as shown in FIG. 18(c), the broadcast signal receiver may decode the FAC immediately after decoding the preamble on channel 3 (indicated by Ch 3 in FIG. 18(c)). Thereby, the broadcast signal receiver may acquire information about the services configuring channel 3.

By repeating the above processes as above up to channel N (indicated by Ch N in FIG. 18(d)), the broadcast signal receiver may quickly acquire information about services configuring each of the entirety of the channels.

Figure 19:
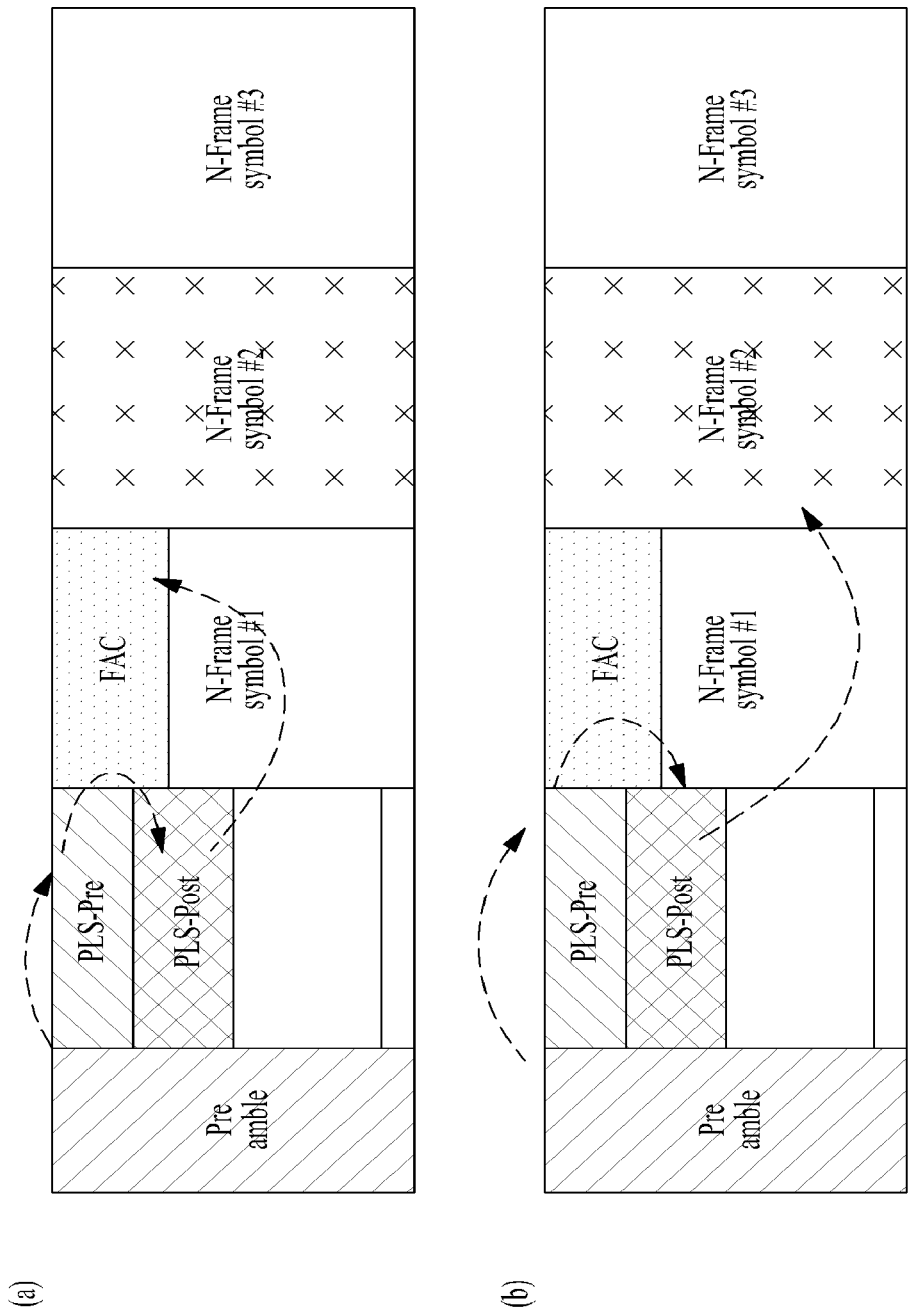
FIG. 19 illustrates operation of a broadcast signal receiver according to one embodiment of the present invention.

FIG. 19 illustrates operation of a broadcast signal receiver according to one embodiment of the present invention.

FIG. 19 illustrates the broadcast signal receiver of the broadcast signal receiver according to one embodiment which performs the FAC data decoding based on PLS data in the case in which the broadcast signal receiver receives a signal frame inducing a FAC. A broadcast signal transmitter according to one embodiment may build a signal frame including the FAC having a variable size. In this case, the broadcast signal transmitter may perform mapping of the PLS-pre information and the PLS-post information and then insert the FAC (or map), thereby generating a signal frame.

According to this embodiment, the signal frame may be continuously transmitted over one RF channel in the time axis, and FIG. 19 shows a signal frame transmitted for the N-th time (indicated by N-Frame). As described above, the preamble may be positioned at the foremost end of a signal frame, and the PLS-pre information, FAC, and PLS-post information may be subsequently mapped. Thereafter, data symbol #1 (indicated by symbol #1 in FIG. 17), data symbol #2 (indicated by symbol #2 in FIG. 17), and data symbol #3 (indicated by symbol #3 in FIG. 17) may be sequentially mapped.

FIG. 19(a) is a diagram illustrating a process in which a broadcast signal receiver according to one embodiment decodes the FAC data included in a signal frame.

FIG. 19(b) is a diagram illustrating a process in which the broadcast signal receiver according to one embodiment decodes the DP data included in the signal frame.

The arrows shown in the figures represent a sequence of specific operations of the broadcast signal receiver performed in the signal frame to acquire the FAC or DP data.

Referring to FIG. 19(a), according to this embodiment, the PLS-pre information included in the signal frame may have a fixed size and the size of the PLS-post information is variable. Accordingly, the broadcast signal receiver may detect the preamble and decode the PLS-pre information, thereby acquiring information for decoding the PLS-post information. The broadcast signal receiver may decode the PLS-post information using the decoded PLS-pre information.

The PLS-pre or PLS-post of the signal frame including the FAC having a variable size may information about the FAC (the size of the FAC, the type of modulation applied to the FAC, a code rate applied to the FAC, etc.).

Accordingly, the broadcast signal receiver having received a signal frame including the FAC having a variable size may sequentially decode the PLS-pre information and the PLS-post information, and then decode the FAC data.

Referring to FIG. 19(b), the DP data included in symbol #2 that the signal frame including the FAC having a variable size includes may be decoded through the following processes.

As described above, the broadcast signal receiver according to one embodiment may decode the PLS-pre information based on the information included in the preamble, thereby acquiring the information for decoding the PLS-post information. The broadcast signal receiver may decode PLS-post information based on the PLS-pre information. The PLS-post information may include information about DPs included in the signal frame. Accordingly, upon detecting a signal frame to which signal frame structure B is applied, the broadcast signal receiver may detect the preamble, and sequentially decode the PLS-pre information and the PLS-post information. Thereafter, the broadcast signal receiver may decode the DP data.

As described above, the broadcast signal receiver may decode the FAC data after decoding the preamble and PLS (including PLS-pre and PLS-post) information. This embodiment is the same as the previous embodiment in that the DP data is decoded after the preamble and the PLS (including PLS-pre and PLS-post) information is decoded.

As shown in FIG. 19, since the broadcast signal receiver cab acquire the FAC only after decoding both the PLS-pre information and the PLS-post information, FAC signaling may not be performed as quickly as in the case of the signal frame structure illustrated in FIG. 17. However, according to this embodiment, the PLS-pre information and the PLS-post information need to be mapped onto the preamble symbol, the FAC include various kinds of information enabling fast acquisition of services. Therefore, by mapping the FAC after the PLS-pre information and PLS-post information, this embodiment may have a higher degree of freedom in terms of the size of the FAC and the protection level. In addition, since the FAC can be mapped onto the preamble symbol, signaling symbol or data symbol region, the FAC may be flexibly designed. After the PLS data is mapped onto the preamble symbol or signaling symbol, the FAC may be continuously mapped onto the signal frame after the PLS data. In this case, the FAC may be mapped onto at least two regions from the preamble symbol region to the data symbol region.

While the FAC is illustrated as having a variable size in FIG. 19, embodiments of the present invention are not limited thereto.

Figure 20:
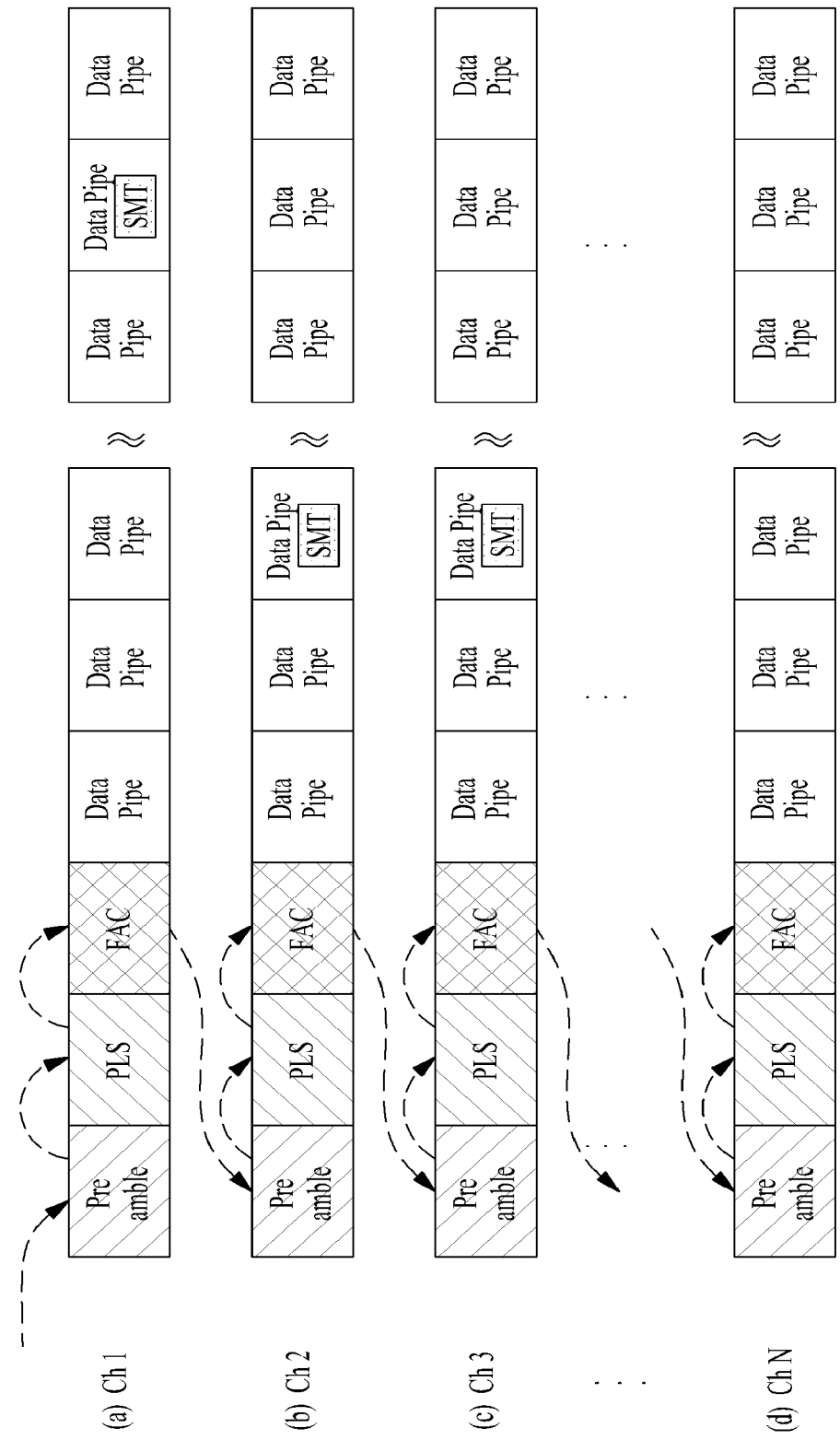
FIG. 20 illustrates a channel scanning mechanism of a broadcast signal receiver of one embodiment of the present invention which decodes the FAC data based on the PLS data when the broadcast signal receiver receives a signal frame including the FAC.

FIG. 20 illustrates a channel scanning mechanism of a broadcast signal receiver of one embodiment of the present invention which decodes the FAC data based on the PLS data when the broadcast signal receiver receives a signal frame including the FAC.

The arrows shown in FIG. 18 represent a sequence of the overall channel scanning operation of the broadcast signal receiver.

Referring to FIG. 20(a), to implement fast channel scan, the broadcast signal receiver may decode the PLS data after decoding the preamble on channel 1 (indicated by Ch 1 in FIG. 20(a)). Thereafter, the broadcast signal receiver may decode the FAC, thereby acquiring information about the services configuring channel 1.

Thereafter, as shown in FIG. 20(b), the broadcast signal receiver may decode the PLS data after decoding the preamble on channel 2 (indicated by Ch 2 in FIG. 20(b)). Thereafter, the broadcast signal receiver may decode the FAC, thereby acquiring information about the services configuring channel 2.

Thereafter, as shown in FIG. 20(c), the broadcast signal receiver may decode the PLS data after decoding the preamble on channel 3 (indicated by Ch 3 in FIG. 20(c)). Thereafter, the broadcast signal receiver may decode the FAC, thereby acquiring information about the services configuring channel 3.

By repeating the above processes as above up to channel N (indicated by Ch N in FIG. 20(d)), the broadcast signal receiver may quickly acquire information about services configuring each of the entirety of the channels.

In the embodiment illustrated in FIG. 20, the broadcast signal receiver may decode the FAC data after performing PLS data decoding. On the other hand, in the embodiment illustrated in FIG. 18, the broadcast signal receiver may decode the FAC data immediately after detecting the preamble without performing PLS data decoding.

FIG. 21 illustrates field information included in a FAC transmitted by a broadcast signal transmitter according to one embodiment of the present invention.

FIG. 21(a) shows a fast scan table including field information transmitted over the FAC.

FIG. 21(b) illustrates a component type table showing component types according to values of Component_type in the field information included in the FAC transmitted by a broadcast signal transmitter according to one embodiment.

The FAC may include information enabling connection between a logical channel and a physical channel so as to quickly acquire service configuration of a specific RF channel received by the broadcast signal receiver. That is, the broadcast signal receiver may acquire information about a specific RF channel and the services received over the specific RF channel from the information included in the FAC. The information about the specific RF channel and the services received over the specific RF channel may be referred to as channel information.

Referring to FIG. 21(a), details of the information included in the fast scan table transmitted on the FAC are as follows. The Num_Service field may indicate the total number of services included in a currently scanned RF channel. Thereby, information about the services may be included by the total number of the services indicated by the Num_Service field. The first "for" loop (for (i=0; i<Num_service; i++)) shown in FIG. 21(a) describes the field representing information about the services.

The Service_id field may indicate ID information for identifying a service. A broadcast signal receiver according to one embodiment may identify the services based on the Service_id field information.

The Section_DP_ID field may indicate a DP including section information (e.g., a service map table (SMT), a guide access table (GAT), etc.). According to one embodiment, the DP may transmit the section information along with or independently of a service or at least one service component. Accordingly, the broadcast signal receiver may identify a DP including the section information and quickly acquire the DP, using the Section_DP_ID field information.

The Num_Component field indicates the number of service components constituting the identified service.

The Reserved field is an undefined field for later use.

The second "for" loop (for (i=0; i<Num_component; i++)) shown in FIG. 21(a) includes information about components constituting each service.

The Component_type field may indicate the data type of a component. According to one embodiment, the component type may be any one of video, audio, section and NRT. Details of the information indicated by Component_type will be described later.

The DP_ID field may indicate an ID to identify a DP that transmits a corresponding service component.

The Reserved field is an undefined field for later use.

The CRC_32 field may indicate a value of a cyclic redundancy check result for a field transmitted over the FAC.

Hereinafter, details of the information indicated by Component_type transmitted over the FAC will be described with reference to FIG. 21(b).

If the value of the Component_type field is 0x00, the corresponding component may transmit service data. Similarly, if the value of the Component_type field is 0x01, video data may be transmitted. If the value is 0x02, audio data may be transmitted. If the value is 0x03, section data may be transmitted. If the value is 0x04, non-real time (NRT) data may be transmitted through the component. If the Component_type field has a value other than those values, the component type is undefined (reserved) for later use.

The bits may be allocated to each of the fields as show in the figure. The illustrated fields are simply illustrative, and the size and name of each field may be changed depending on the intention of the designer.

Figure 22:
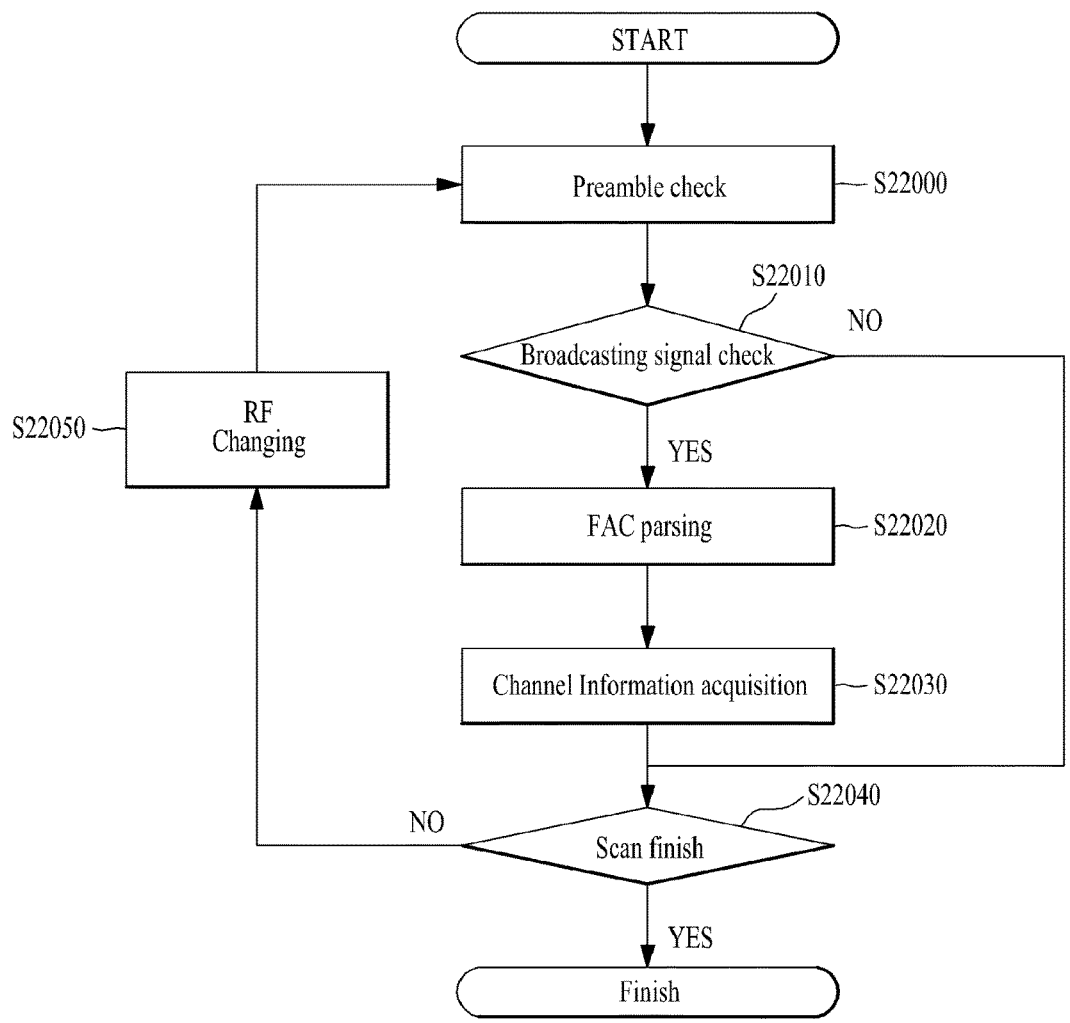
FIG. 22 shows a flowchart applicable to a case in which a broadcast signal receiver according to one embodiment of the present invention performs the fast channel scan.

FIG. 22 shows a flowchart applicable to a case in which a broadcast signal receiver according to one embodiment of the present invention performs the fast channel scan.

The broadcast signal receiver may decode a preamble included in a broadcast signal received over an RF channel (S22000). The preamble may contain information indicating whether the received broadcast signal is a broadcast signal of a next generation broadcasting system according to one embodiment of the present invention. The next generation broadcasting system may be an ATSC 3.0 system. The broadcast signal receiver checks whether the received broadcast signal is a broadcast signal of a next generation broadcasting system of one embodiment (S22010).

If the received signal is not a broadcast signal of the next generation broadcasting system, the broadcast signal receiver may finish channel scan. (S22040)

If the received signal is a broadcast signal of the next generation broadcasting system, the broadcast signal receiver may perform a process of acquiring the FAC from the signal frame. That is, the broadcast signal receiver may detect the preamble and decode FAC data according to the method in which the FAC channel is inserted in a broadcast signal frame. Alternatively, the broadcast signal receiver may detect the preamble and decode, decode PLS data, and then decode the FAC data according to the method in which the FAC channel is inserted in the broadcast signal frame (S22020).

The broadcast signal receiver may acquire connection information between a service constituting the broadcast signal and DP_ID, i.e., the channel information by decoding the FAC. (S22030)

Thereafter, the broadcast signal receiver may finish the channel scan (S22040).

In the case in which the broadcast signal receiver does not finish the channel scan, the broadcast signal receiver may repeat the processes (S22000 to S22040) of changing the RF (RF Changing) and scanning the changed RF channel (S22050).

Figure 23:
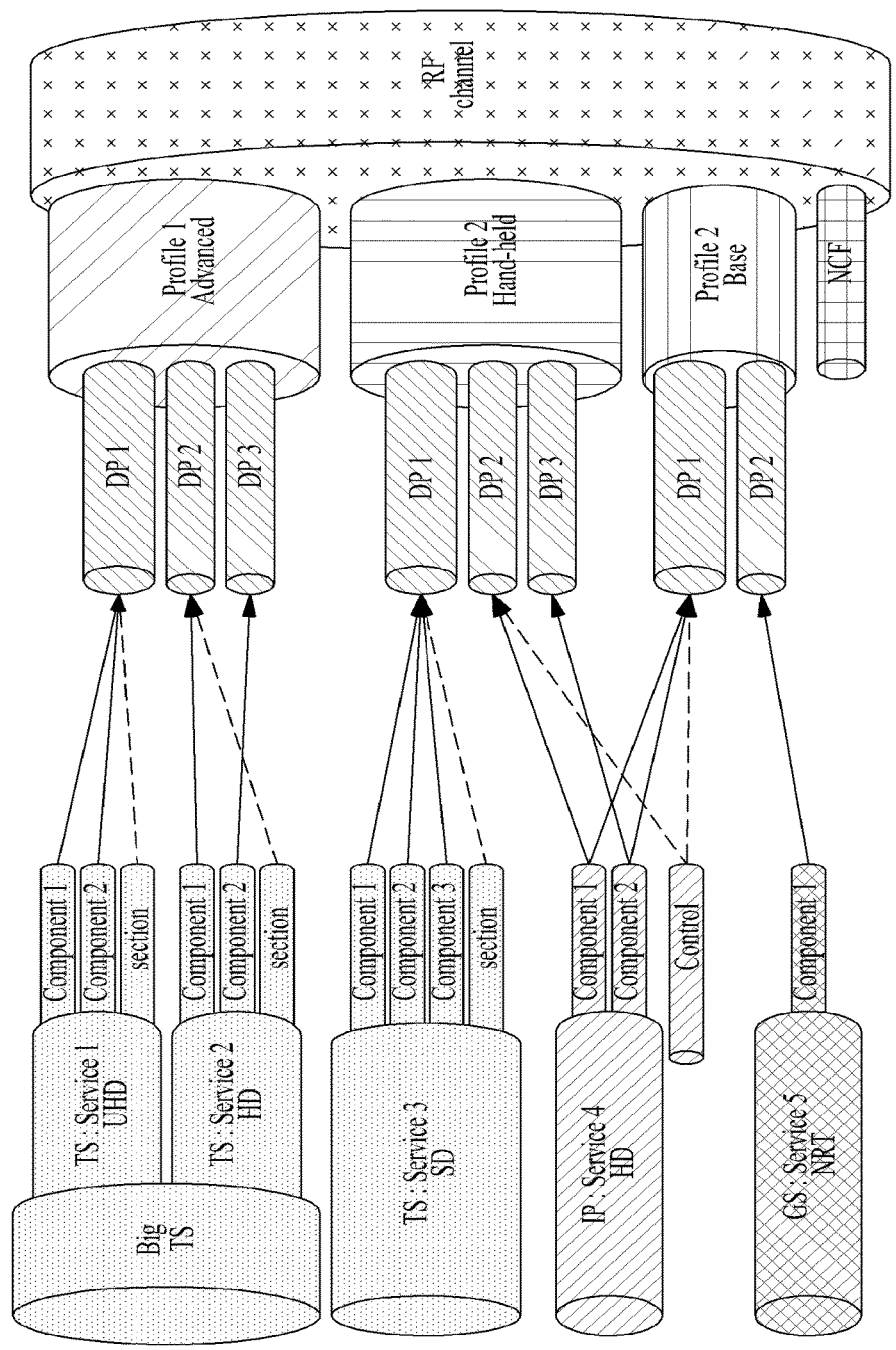
FIG. 23 is a conceptual diagram illustrating a relationship between an upper layer and a physical layer according to one embodiment of the present invention.

FIG. 23 is a conceptual diagram illustrating a relationship between an upper layer and a physical layer according to one embodiment of the present invention.

The illustrated embodiment may be an example of the relationship between a signal frame including the FAC illustrated in FIGS. 16 to 22 and an upper layer.

Specifically, FIG. 23 is a diagram each service corresponding to an upper layer and a DP of a physical layer on which the service is transmitted.

The input to the physical layer may be composed of one or multiple data streams. Each data stream is carried by one DP. A broadcast signal transmitter according to one embodiment splits the input TS, IP, GS streams into multiple service or service component (audio, video, etc.) streams. A data pipe is a logical channel in the physical layer that carries service data or related metadata, which may carry one or multiple service(s) or service component(s).

According to one embodiment, the DP may carry control data or section information. The control data may include information applicable in common to the DPs carrying service component data included in a service or sharable information. The section information may refer to tables such as the SMT and GAT including information relating to services or information itself, which may be changed depending on the intention of the designer.

Hereinafter, three physical layer profiles according to one embodiment of the present invention will be described.

The present invention may define three physical layer (PL) profiles—base, handheld and advanced profiles—each optimized to minimize receiver complexity while attaining the performance required for a particular use case. The physical layer (PHY) profiles are subsets of all configurations that a corresponding receiver should implement.

In this case, the base profile can be used as a profile for both the terrestrial broadcast service and the mobile broadcast service. That is, the base profile can be used to define a concept of a profile which includes the mobile profile. Also, the advanced profile can be divided into advanced profile for a base profile with MIMO and advanced profile for a handheld profile with MIMO. Moreover, the three profiles can be changed according to the intention of the designer.

According to one embodiment, the broadcast signal transmitter may transmit signal frames and non-compatible frames corresponding to the respective the three physical layer profiles over an RF channel (indicated by RF channel in FIG. 23). The NCF is a frame which can be used late for a new broadcasting system. The three types of signal frames transmitted over an RF channel may correspond to the advanced profile, handheld profile, and base profile as shown in FIG. 23. Each signal frame may include at least one DP data. As described above, one DP may carry one or more services or service components. Hereinafter, a structure in which a service to be transmitted over a DP is divided into service or service component units and transmitted will be described.

According to one embodiment, the broadcast signal transmitter may receive five services in the format of one of Big TS (Big Transport Stream), TS (Transport Stream), IP (Internet Protocol), and GS (General Stream). If a stream includes two or more TSs, it may be called Big TS.

A big transport stream (indicated by Big TS in FIG. 23) consists of two services. Service 1, which is an ultra high definition (UHD) service, consists of two service component data (Component 1 and Component 2) and one section data (section).

Service 2 is a high definition (HD) service. Similar to Service 1, Service 2 consists of two service component data (Component 1 and Component 2) and one section data (section).

TS consists of one service (Service 3). Service 3 is a standard definition (SD) service, and consists of three service component data (Component 1, Component 2, and Component 3) and one section data (section).

IP consists of one service (Service 4). Service 4 is a high definition (HD) service, consists of two service component data (Component 1 and Component 2).

GS consists of one service (Service 5). Service 5 is an NRT service, and consists of one service component data (Component 1).

As described above, each signal frame may include one or more DPs. A signal frame corresponding to the advanced profile may include three DPs (DP1, DP2, and DP3). A signal frame corresponding to the handheld profile may include three DPs (DP1, DP2, and DP3). A signal frame corresponding to the base profile may include two DPs (DP1 and DP2).

DP1 of the signal frame corresponding to the advanced profile may include Service 1 of Big TS.

DP2 of the signal frame corresponding to the advanced profile may include data of Component 1 and section data of Service 2 of Big TS.

DP3 of the signal frame corresponding to the advanced profile may include data of Component 2 of Service 2 of Big TS.

DP1 of the signal frame corresponding to the handheld profile may include Service 3 of TS. As described above, Service 3 consists of three service component data (Component 1, Component 2, and Component 3) and one section data (section).

DP2 of the signal frame corresponding to the handheld profile may include data of Component 1 of Service 4 of IP. DP2 of the signal frame corresponding to the handheld profile may further include Control data.

DP3 of the signal frame corresponding to the handheld profile may include data of Component 2 of Service 4 of IP.

DP1 of the signal frame corresponding to the base profile may include data of Component 1 and Component 2 of Service 4 of IP, and Control data.

DP2 of the signal frame corresponding to the base profile may include Service 5 of GS.

As described above, each of services (Service 1, Service 3, Service 5) may be transmitted over an corresponding one of the DPs, or each of services (Service 2, Service 4) may be divided according to service component data and transmitted over multiple DPs. In addition, one component data (Component 1 or Component 2 of Service 4) or control data may be transmitted over two or more DPs.

The illustrated conceptual diagram is simply illustrative, may be changed depending on the intention of the designer.

FIG. 24 shows an exemplary table of FAC field information in a case in which a broadcast signal transmitter according to one embodiment transmits signal frame having the signal frame structure described above over an RF channel.

FIG. 24 shows an example of the FAC field information illustrated in FIGS. 16 to 22 in the form of table.

Specifically, FIG. 24 shows FAC field information in the form of table in a case in which the signal frame conforms to the relationship between the upper layer and the physical layer according to the embodiment of FIG. 23.

According to one embodiment, the broadcast signal receiver may acquire information about services which may be transmitted over the respective DPs and component information through the table. The information about services may include DP information including a service, a service ID and section information. The component information may include component type and DP information carrying a corresponding component. Hereinafter, the table of FIG. 24 will be described.

The advanced profile may include the UHD service and the HD service. The service ID of the UHD service is 0x01, and the corresponding DP including the section information is DP1. The component type is AV (service), and may be transmitted over DP1.

The service ID of the HD service of the advanced profile is 0x02, and the corresponding DP including the section information is DP2. The component types constituting the HD service of the advanced profile are V (video) and A (audio). The component data having the component type of V may be transmitted over DP2, and the component data having the component type of A may be transmitted over DP3.

The handheld profile may include the SD service and the HD service. The service ID of the SD service is 0x03, and the corresponding DP including the section information is DP1. The component type constituting the SD service of the handheld profile is AV (service), and the corresponding data may be transmitted over DP1.

The service ID of the HD service of the handheld profile is 0x04, and the corresponding DP including the section information is DP2. The component types constituting the HD service of the handheld profile are V (video) and A (audio). The component data having the component type of V may be transmitted over DP2, and the component data having the component type of A may be transmitted over DP3.

The base profile may include the HD service and the NRT service. The service ID of the HD service of the base profile is 0x04, and the corresponding DP including the section information is DP1. The component type constituting the HD service of the base profile is AV (service), and the corresponding data may be transmitted over DP1.

The service ID of the NRT service of the base profile is 0x05, and the corresponding DP including the section information is DP2. The component type constituting the NRT service of the base profile is NRT, and the corresponding data may be transmitted over DP2.

FIG. 25 shows an example of FAC field data that is actually transmitted in the case in which a broadcast signal transmitter according to one embodiment transmits a signal frame having the signal frame structure described above over an RF channel.

FIG. 25 shows an example of the actually transmitted FAC field data of the FAC field illustrated in FIGS. 16 to 22.

Specifically, FIG. 25 illustrates an example of FAC field data in a case in which the signal frame conforms to the relationship between the upper layer and the physical layer according to the embodiment of FIG. 23.

According to one embodiment, the broadcast signal transmitter may generate FAC field data shown in FIG. 25 and transmit the same along with a signal frame.

FIG. 25(a) shows specific values of FAC field data of the advanced profile.

FIG. 25(b) shows specific values of FAC field data of the handheld profile.

FIG. 25(c) shows specific values of FAC field data of the base profile.

Each profile transmitted over the RF channel described above may carry two services. Therefore, FAC field (Num_Service) data indicating the number of services of the respective profiles may all have the value of 0x02. Hereinafter, a field indicating the service information and a field indicating the component information will be described for each profile.

Referring to FIG. 25(a), the advanced profile may include two services, each of which may include at least one component, as described above. As described above, the field indicating the service information may include a service ID, a section DP ID, and data of the number of component types (Num_Component) that a service includes. Accordingly, Service 1 (0x01 0x01 0x01) may indicate that Service_ID is 0x01, Section_DP_ID is 0x01, Num_Component is 0x01, i.e. a case in which there is one component type.

Subsequently, comp 1 (0x00 0x01) may indicate a service (0x00) and a DP (0x01, i.e., DP1) over which a corresponding component is transmitted. The data of the component type has been described above.

Similarly, Service 2 may indicate that Service_ID is 0x02, Section_DP_ID is 0x02, and Num_Component is 0x02, i.e., a case in which there are two component types. Accordingly, the data field of each of comp 1 and comp 2 may indicate the type of a corresponding component and a DP over which the component type is transmitted. A video component (0x01) may be transmitted over DP2 (0x02), and an audio component (0x02) may be transmitted over DP3 (0x03).

Referring to FIG. 25(b), the handheld profile may include two services, each of which may include at least one component. As described above, the field indicating the service information may include a service ID, a section DP ID, and data of the number of component types (Num_Component) that a service includes. Accordingly, Service 1 (0x03 0x01 0x01) may indicate that Service_ID is 0x03, Section_DP_ID is 0x01, and Num_Component is 0x01, i.e. a case in which there is one component type.

Subsequently, comp 1 (0x00 0x01) may indicate a service (0x00) and a DP (0x01, i.e., DP1) over which a corresponding component is transmitted. The data of the component type has been described above.

Similarly, Service 2 may indicate that Service_ID is 0x04, Section_DP_ID is 0x02, and Num_Component is 0x02, i.e., a case in which there are two component types. Accordingly, the data field of each of comp 1 and comp 2 may indicate the type of a corresponding component and a DP over which the component type is transmitted. A video component (0x01) may be transmitted over DP2 (0x02), and an audio component (0x02) may be transmitted over DP3 (0x03).

Referring to FIG. 25(c), the base profile may include two services, each of which may include at least one component. As described above, the field indicating the service information may include service ID, section DP ID, a service ID, a section DP ID, and data of the number of component types (Num_Component) that a service includes. Accordingly, Service 1 (0x04 0x01 0x01) may indicate that Service_ID is 0x04, Section_DP_ID is 0x01, and Num_Component is 0x01, i.e., a case in which there is one component type.

Subsequently, comp 1 (0x00 0x01) may indicate a service (0x00) and a DP (0x01, i.e., DP1) over which a corresponding component is transmitted. The data of the component type has been described above.

Similarly, Service 2 may indicate that Service_ID is 0x04, Section_DP_ID is 0x02, and Num_Component is 0x01, i.e., a case in which there is one component types. Similarly, comp 1 (0x03 0x02) may indicate a section (0x03) and a DP (0x02, i.e., DP2) over which a corresponding component is transmitted.

FIG. 26 is a flowchart illustrating a method for transmitting a broadcast signal according to one embodiment of the present invention.

According to one embodiment, a broadcast signal transmitter may encode data (or service data) carrying at least one broadcast service component (S26000). The data may be processed for each DP corresponding to the data as described above. Data encoding may be performed by the coding & modulation module 1100.

Thereafter, the broadcast signal transmitter may map the encoded data (or service data) onto constellations (S26010). Data mapping may be performed by the coding & modulation module 1100.

Thereafter, the broadcast signal transmitter may encode signaling data (or physical signaling data) (S26020). According to one embodiment, the signaling data may include information relating to FAC. The signaling data may include PLS-pre information and PLS-post information, and the information relating to the FAC may be included in the PLS-post information. The information relating to the FAC may include information about the length of the FAC and information indicating whether a signal frame includes the FAC. Signaling data encoding may be performed by the signaling generation module 1400.

Thereafter, the broadcast signal transmitter may build at least one signal frame (S26030). According to one embodiment, the signal frame may include preamble data, signaling data and service data. The signal frame may include a FAC. For a broadcast signal receiver according to one embodiment, the function of the FAC and the information that the FAC can include are the same as described above. Building the signal frame may be performed by the frame structure module 1200.

Thereafter, the broadcast signal transmitter may modulate the at least one built signal frame in the OFDM scheme (S26040). The OFDM modulation of the signal frame may be performed by the waveform generation module 1300.

Thereafter, the broadcast signal transmitter may transmit at least one broadcast signal including the at least one built and modulated signal frame (26050).

FIG. 27 is a flowchart illustrating a method for receiving a broadcast signal according to one embodiment of the present invention.

The method illustrated in FIG. 27 corresponds to the reverse processes of the method for transmitting a broadcast signal illustrated in FIG. 26.

According to one embodiment, a broadcast signal receiver may receive at least one broadcast signal (S27000). The broadcast signal may include a FAC. As described above, the broadcast signal receiver having received a plurality of broadcast signals including the FAC may further detect a preamble, quickly scan a plurality of channels, and acquire the service information included in each of the channels.

Thereafter, the broadcast signal receiver may demodulate the at least one received broadcast signal in the OFDM scheme (S27010). Demodulation of the broadcast signal may be performed by the synchronization & demodulation module 8000.

Thereafter, the broadcast signal receiver may separate at least one signal frame from the demodulated broadcast signal (S27020). Separation of the signal frame may be performed by the frame parsing module 8100.

Thereafter, the broadcast signal receiver may decode the signaling data (or physical signaling data) included in the at least one signal frame (S27030). According to one embodiment, the signaling data may include information relating to the FAC. The information relating to the FAC may include information about the length of the FAC. Decoding of the signaling data may be performed by the signaling decoding module 8400. Decoding of the FAC data may also be performed by the signaling decoding module 8400.

As illustrated in FIGS. 17 and 18, the broadcast signal receiver may perform FAC data decoding immediately after detecting the preamble.

Alternatively, as illustrated in FIGS. 19 and 20, the broadcast signal receiver may perform FAC data decoding after detecting the preamble and then decoding the PLS data.

Thereafter, the broadcast signal receiver may demap the data (or service data) included in the at least one signal frame (S27040). Demapping of the data may be performed by the demapping & decoding module 8200.

Thereafter, the broadcast signal receiver may decode service data carrying at least one broadcast service component (S27050). Decoding of the data may be performed by the demapping & decoding module 8200.

What is claimed is:

1. A method for transmitting broadcast signals by an apparatus for transmitting broadcast signals, the method comprising:
   encoding service data;
   mapping the encoded service data onto constellations;
   encoding physical signaling data;
   building at least one signal frame including the physical signaling data and the mapped service data;
   modulating the at least one signal frame by an Orthogonal Frequency Division Multiplex (OFDM) scheme; and
   transmitting the broadcast signals carrying the modulated at least one signal frame,
   wherein the physical signaling data includes information indicating whether service information for a channel scan and a service acquisition is present,
   wherein when the information has a non-zero value, the at least one signal frame includes the service information,
   wherein the service information includes information for identifying each service data,
   wherein the service information is located after the physical signaling data in the at least one signal frame.

2. The method of claim 1,
   wherein the service information includes service number information indicating a number of services corresponding to the broadcast signals.

3. The method of claim 2,
   wherein the method further includes:
   MIMO processing the mapped service data.

4. A method for receiving broadcast signals by an apparatus for receiving broadcast signals, the method comprising:
   receiving the broadcast signals;
   demodulating the received broadcast signals by an Orthogonal Frequency Division Multiplex (OFDM) scheme;

parsing at least one signal frame from the demodulated broadcast signals including physical signaling data and service data;

wherein the physical signaling data includes information indicating whether service information for a channel scan and a service acquisition is present, wherein when the information has a non-zero value, the at least one signal frame includes the service information, wherein the service information includes information for identifying each service data, wherein the service information is located after the physical signaling data in the at least one signal frame;

decoding the physical signaling data;

demapping the service data; and decoding the service data.

5. The method of claim 4, wherein the service information includes service number information indicating a number of services corresponding to the broadcast signals.

6. The method of claim 5, wherein the method further includes:

MIMO processing the service data.

7. An apparatus for transmitting broadcast signals, the apparatus comprising:

an encoder to encode service data;

a mapper to map the encoded service data onto constellations;

an encoder to encode physical signaling data;

a frame builder to build at least one signal frame including the physical signaling data and the mapped service data;

a modulator to modulate the at least one signal frame by an Orthogonal Frequency Division Multiplex (OFDM) scheme; and a transmitter to transmit the broadcast signals carrying the modulated at least one signal frame, wherein the physical signaling data includes information indicating whether service information for a channel scan and a service acquisition is present, wherein when the information has a non-zero value, the at least one signal frame includes the service information, wherein the service information includes information for identifying each service data, wherein the service information is located after the physical signaling data in the at least one signal frame.

8. The apparatus of claim 7, wherein the service information includes service number information indicating a number of services corresponding to the broadcast signals.

9. The apparatus of claim 8, wherein the apparatus further includes:

a MIMO processor to process the mapped service data.

10. An apparatus for receiving broadcast signals, the apparatus comprising:

a receiver to receive the broadcast signals;

a demodulator to demodulate the received broadcast signals by an Orthogonal Frequency Division Multiplex (OFDM) scheme;

a frame parser to parse at least one signal frame from the demodulated broadcast signals including physical signaling data and service data;

wherein the physical signaling data includes information indicating whether service information for a channel scan and a service acquisition is present, wherein when the information has a non-zero value, the at least one signal frame includes the service information, wherein the service information includes information for identifying each service data, wherein the service information is located after the physical signaling data in the at least one signal frame;

a decoder to decode the physical signaling data;

a demapper to demap the service data; and a decoder to decode the service data.

11. The apparatus of claim 10, wherein the service information includes service number information indicating a number of services corresponding to the broadcast signals.

12. The apparatus of claim 11, wherein the method further includes:

a MIMO processor to process the service data.

* * * * *